(12) United States Patent
Ishibashi et al.

(10) Patent No.: US 9,225,174 B2
(45) Date of Patent: Dec. 29, 2015

(54) CONTROL SYSTEM, CONTROL APPARATUS AND CONTROL METHOD

(71) Applicant: Sony Corporation, Tokyo (JP)

(72) Inventors: Yoshihito Ishibashi, Tokyo (JP); Junichi Sawada, Kanagawa-ken (JP); Rui Kamada, Kanagawa-ken (JP)

(73) Assignee: SONY CORPORATION, Tokyo (JP)

( * ) Notice: Subject to any disclaimer, the term of this patent is extended or adjusted under 35 U.S.C. 154(b) by 483 days.

(21) Appl. No.: 13/661,554

(22) Filed: Oct. 26, 2012

(65) Prior Publication Data

US 2013/0106188 A1 May 2, 2013

(30) Foreign Application Priority Data

Nov. 2, 2011 (JP) .................................. 2011-241136

(51) Int. Cl.
*H01F 1/37* (2006.01)
*H02J 3/38* (2006.01)
*H02J 7/35* (2006.01)

(52) U.S. Cl.
CPC .................. *H02J 3/382* (2013.01); *H02J 3/385* (2013.01); *H02J 7/35* (2013.01); *Y02E 10/58* (2013.01); *Y10T 307/516* (2015.04)

(58) Field of Classification Search
CPC ............. H02J 3/382; H02J 7/35; H02J 3/385; H02J 7/0027; H02J 7/008; H02J 17/00; H02J 5/005; H02J 3/01
USPC ............ 307/46, 80; 361/42; 318/816; 392/49
See application file for complete search history.

(56) References Cited

U.S. PATENT DOCUMENTS

| | | | | |
|---|---|---|---|---|
| 4,494,180 A | * | 1/1985 | Streater et al. | 363/37 |
| 4,794,272 A | * | 12/1988 | Bavaro et al. | 307/66 |
| 2009/0108820 A1 | * | 4/2009 | Mirea | 323/271 |
| 2011/0181233 A1 | * | 7/2011 | Mino et al. | 320/101 |

FOREIGN PATENT DOCUMENTS

JP 2009-17686 1/2009

* cited by examiner

*Primary Examiner* — Jared Fureman
*Assistant Examiner* — Rafael Pacheco
(74) *Attorney, Agent, or Firm* — Hazuki International, LLC

(57) ABSTRACT

Disclosed herein is a control system, including: a first apparatus configured to adjust an output voltage thereof so that the output voltage may be included in a range determined in advance in response to a variation of an input voltage thereto from an electric power generation section; and a second apparatus configured to change a charge rate into a battery in response to the variation of the input voltage supplied from the first apparatus, wherein when a state in which the output voltage from the first apparatus is near to a lower limit thereof continues for a period longer than a period of time set in advance, one of two or more lower limits prepared in advance is selected as the value of the lower limit in accordance with to which one of sections set in advance input current from the electric power generation section belongs.

8 Claims, 16 Drawing Sheets

CONTROL SYSTEM, CONTROL APPARATUS AND CONTROL METHOD

BACKGROUND

The present disclosure relates to a control system, a control apparatus and a control method. More particularly, the present disclosure relates to a control system, a control apparatus and a control method for efficiently extracting electric power from an electric generator whose terminal voltage exhibits a fluctuation such as a solar cell.

In recent years attention is paid to natural energy also called clean energy, which emits no air pollution offender upon electric power generation.

The natural energy is electric power obtained, for example, by photovoltaic power generation, solar thermal power generation, wind power generation or the like. Also it is attempted actively to extract electric energy from kinetic energy generated by human activities although the generated power is low in comparison with that by photovoltaic power generation and so forth.

Incidentally, a solar cell has a characteristic that the voltage and the current to be extracted therefrom depend upon the power consumption required by a load connected thereto. For example, if a solar cell is used to charge a battery, then the current to be extracted from the solar cell depends upon the voltage required by the battery.

Therefore, if the electric power accepted by the load connected to the solar cell is inappropriate, then the generated power obtained from the solar cell suffers from some loss. The characteristic that, since the voltage and the current to be extracted depend upon the power consumption required by the load connected to the solar cell, the electric power obtained by the electric power generation is not fixed commonly applies also to an electric generator which uses wind power.

Further, for example, in the case of photovoltaic power generation, the electric power obtained by the electric power generation sometimes fluctuates suddenly by a variation in illumination intensity upon or a variation in temperature of the solar cell.

Therefore, in order to extract power efficiently and stably from a solar cell, generally a power conditioner having a maximum power point tracking (MPPT) controlling function is interposed between the solar cell and the load. According to the MPPT control, a voltage value with which the product of the current and the voltage extracted from the solar cell is maximized is determined successively by calculation. Then, the terminal voltage of the solar cell is changed so that the generated electric power obtained by the electric power generation from the solar cell may be maximized.

Although the MPPT control is superior in that electric power is extracted efficiently from the solar cell, since the calculation includes multiplication, also the load of the calculation is high. Further, since time is required for the calculation, the MPPT control is not easy to deal with a sudden variation of the illumination intensity upon the solar cell or the like.

Therefore, control by a voltage tracking method which can be implemented by a circuit which is simple in comparison with that by the MPPT control is sometimes applied. It is to be noted that Japanese Patent Laid-open No. 2009-017686 discloses that output current of a charge controlling IC (Integrated Circuit) for a lithium battery is fed back to a controlling program terminal to control the maximum voltage of the solar cell to a fixed voltage.

SUMMARY

In the field in which natural energy is used, enhancement and stabilization of electric power to be extracted from an electric generator are demanded.

According to a first embodiment of the present disclosure, there is provided a control system including a first apparatus configured to adjust an output voltage thereof so that the output voltage may be included in a range determined in advance in response to a variation of an input voltage thereto from an electric power generation section, and a second apparatus configured to change a charge rate into a battery in response to the variation of the input voltage supplied from the first apparatus. In the control system, when a state in which the output voltage from the first apparatus is near to a lower limit thereof continues for a period longer than a period of time set in advance, one of two or more lower limits prepared in advance is selected as the value of the lower limit in accordance with to which one of sections set in advance input current from the electric power generation section belongs.

According to a second embodiment of the present disclosure, there is provided a control apparatus, wherein the control apparatus adjusts an output voltage thereof so that the output voltage may be included in a range determined in advance in response to a variation of an input voltage thereto from an electric power generation section and selects, when a state in which the output voltage is near to a lower limit thereof in the range determined in advance continues for a period longer than a period of time set in advance, one of two or more lower limits prepared in advance as the value of the lower limit in accordance with to which one of sections set in advance input current from the electric power generation section belongs.

According to a third embodiment of the present disclosure, there is provided a control method including adjusting an output voltage from a first apparatus so that the output voltage may be included in a range determined in advance in response to a variation of an input voltage from an electric power generation section, changing a charge rate into a battery in response to the variation of the input voltage supplied from the first apparatus to a second apparatus, and selecting, when a state in which the output voltage from the first apparatus is near to a lower limit thereof continues for a period longer than a period of time set in advance, one of two or more lower limits prepared in advance as the value of the lower limit in accordance with to which one of sections set in advance input current from the electric power generation section belongs.

With at least one of the embodiments, electric power can be extracted efficiently and stably from the electric power generation section.

The above and other features and advantages of the present disclosure will become apparent from the following description and the appended claims, taken in conjunction with the accompanying drawings in which like parts or elements denoted by like reference symbols.

DETAILED DESCRIPTION OF THE PREFERRED EMBODIMENT

In the following, an embodiment of the present disclosure is described with reference to the accompanying drawings. It is to be noted that the description is given in the following order.
<1. Embodiment>
<2. Modifications>
It is to be noted that the embodiment and the modifications described below are specific preferred examples of the present disclosure, and the present disclosure is not limited to the embodiment and the modifications.
<1. Embodiment>
[Configuration of the System]

Figure 1:
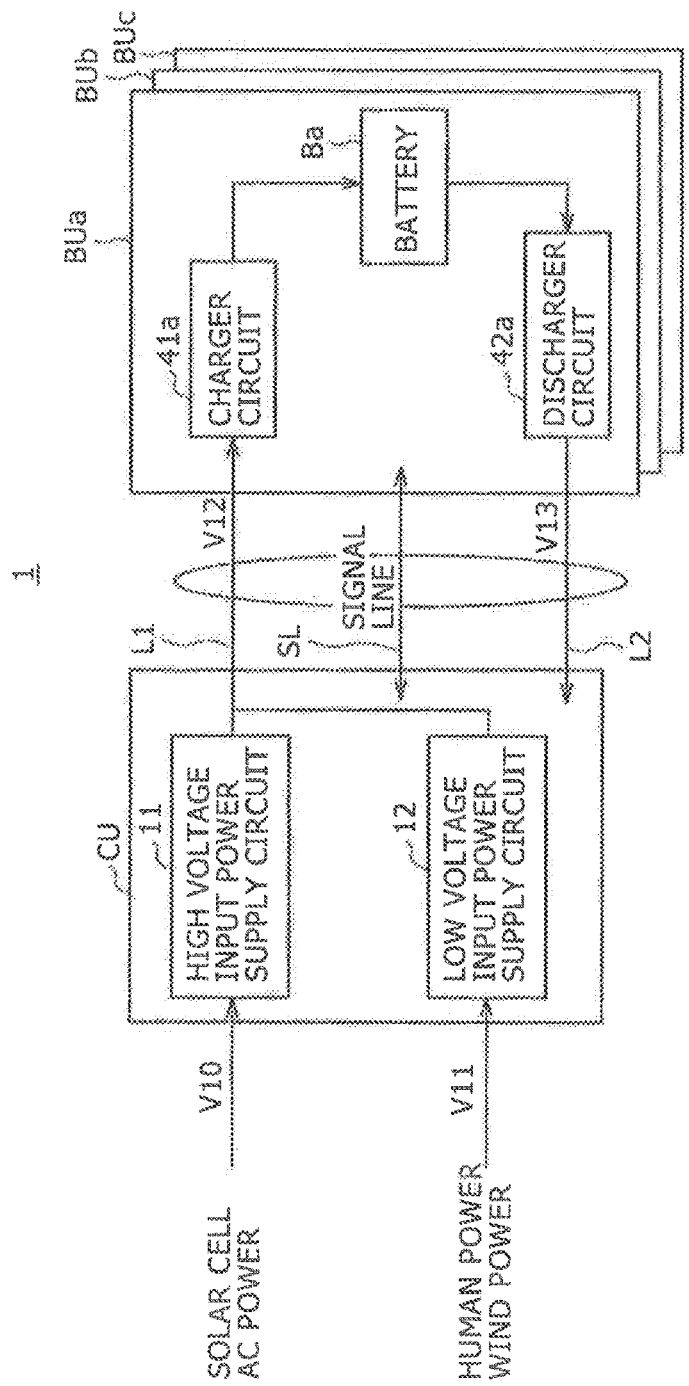
FIG. 1 is a block diagram showing an example of a configuration of a system.

FIG. 1 shows an example of a configuration of a control system according to the present disclosure. The control system is configured from one or a plurality of control units CU and one or a plurality of battery units BU. The control system 1 shown as an example in FIG. 1 includes one control unit CU, and three battery units BUa, Bub and BUc. When there is no necessity to distinguish the individual battery units, each battery unit is suitably referred to as battery unit BU.

In the control system 1, it is possible to control the battery units BU independently of each other. Further, the battery units BU can be connected independently of each other in the control system 1. For example, in a scale in which the battery unit BUa and the battery unit BUb are connected in the control system 1, the battery unit BUc can be connected newly or additionally in the control system 1. Or, in a state in which the battery units BUa to BUc are connected in the control system 1, it is possible to remove only the battery unit BUb from the control system 1.

The control unit CU and the battery units BU are individually connected to each other by electric power lines. The power lines include, for example, an electric power line L1 by which electric power is supplied from the control unit CU to the battery units BU and another electric power line L2 by which electric power is supplied from the battery units BU to the control unit CU. Thus, bidirectional communication is carried out through a signal line SL between the control unit CU and the battery units BU. The communication may be carried out in conformity with such specifications as, for example, the SMBus (System Management Bus) or the UART (Universal Asynchronous Receiver-Transmitter).

The signal line SL is configured from one or a plurality of lines, and a line to be used is defined in accordance with an object thereof. The signal line SL is used commonly, and the battery units BU are connected to the signal line SL. Each battery unit BU analyzes the header part of a control signal transmitted thereto through the signal line SL to decide whether or not the control signal is destined for the battery unit BU itself. By suitably setting the level and so forth of the control signal, a command to the battery unit BU can be transmitted. A response from a battery unit BU to the control unit CU is transmitted also to the other battery unite BU. However, the other battery units BU do not operate in response to the transmission of the response. It is to be noted that, while it is assumed that, in the present example, transmission of electric power and communication are carried out by means of wires, they may otherwise be carried out by radio.

[General Configuration of the Control Unit]

The control unit CU is configured from a high voltage input power supply circuit 11 and a low voltage input power supply circuit 12. The control unit CU has one or a plurality of first devices. In the present example, the control unit CU has two first devices, which individually correspond to the high voltage input power supply circuit 11 and the low voltage input power supply circuit 12. It is to be noted that, although the terms "high voltage" and "low voltage" are used herein, the voltages to be inputted to the high voltage input power supply circuit 11 end the low voltage input power supply circuit 12 may be included in the same input range. The input ranges of the voltages which can be accepted by the high voltage input power supply circuit 11 and the low voltage input power supply circuit 12 may overlap with each other.

A voltage generated by an electric power generation section which generates electricity in response to the environment is supplied to the high voltage input power supply circuit 11 and the low voltage input power supply circuit 12. For example, the electric power generation section is an apparatus which generates electricity by the sunlight or wind power. Meanwhile, the electric power generation section is not limited to that apparatus which generates electricity in response the natural environment. For example, the electric power generation section may be configured as an apparatus which generates electricity by human power. Although an electric generator whose power generation energy fluctuates in response to the environment or the situation is assumed in this manner, also that electric generator whose power generation energy does not fluctuate is applicable. Therefore, as seen in FIG. 1, also AC power can be inputted to the control system 1. It is to be noted that voltages are supplied from the same electric power generation section or different electric power generation sections to the high voltage input power supply circuit 11 and the low voltage input power supply circuit 12. The voltage or voltages generated by the electric power generation section or sections are an example of a first voltage or voltages.

To the high voltage input power supply circuit 11, for example, a DC (Direct Current) voltage V10 of approximately 75 to 100 V (volts) generated by photovoltaic power generation is supplied. Alternatively, an AC (Alternating Current) voltage of approximately 100 to 250 V may be supplied to the high voltage input power supply circuit 11. The high voltage input power supply circuit 11 generates a second voltage in response to a fluctuation of the voltage V10 supplied thereto by photovoltaic power generation, for example, the voltage V10 is stepped down by the high voltage input power supply circuit 11 to generate the second voltage. The second voltage is a DC voltage, for example, within a range of 45 to 48 V.

When the voltage V10 is 75 V, the high voltage input power supply circuit 11 converts the voltage V10 into 45 V. However, when the voltage V10 is 100 V, the high voltage input power supply circuit 11 converts the voltage V10 into 48 V. In response to a variation of the voltage V10 within the range from 75 to 100 V, the high voltage input power supply circuit 11 generates the second voltage such that the second voltage changes substantially linearly within the range from 45 to 48 V. The high voltage input power supply circuit 11 outputs the generated second voltage. It is to be noted that the rate of change of the second voltage need not necessarily be linear, but a feedback circuit may be used such that the output of the high voltage input power supply circuit 11 is used as it is.

To the low voltage input power supply circuit 12, a DC voltage V11 within a range of 10 to 40 V generated, for example, by electric power generation by wind or electric power generation by human power is supplied. The low voltage input, power supply circuit 12 generates a second voltage in response to a fluctuation of the voltage V11 similarly to the high voltage input power supply circuit 11. The low voltage input power supply circuit 12 steps up the voltage V11, for example, to a DC voltage within the range of 45 to 48 V in response to a change of the voltage V11 within the range from 10 V to 40 V. The stepped up DC voltage is outputted from the low voltage input power supply circuit 12.

Both or one of the output voltages of the high voltage input power supply circuit 11 and the low voltage input power supply circuit 12 is inputted to the battery units BU. In FIG. 1, the DC voltage supplied to the battery units BU is denoted by V12. As described hereinabove, the voltage V12 is, for example, a DC voltage within the range from 45 to 48 V. All or some of the battery units BU are charged by the voltage V12. It is to be noted that a battery unit BU which is discharging is not charged.

A personal computer may be connectable to the control unit CU. For example, a USB (Universal Serial Bus) cable is used to connect the control unit CU and the personal computer to each other. The control unit CU may be controlled using the personal computer.

[General Configuration of the Battery Unit]

A general configuration of a battery unit which is an example of a second apparatus is described, while description is given below taking the battery unit BUa as an example, unless otherwise specified, the battery unit BUb and the battery unit BUc have the same configuration.

The battery unit BUa includes a charger or charging circuit 41a, a discharger or discharging circuit 42a and a battery Ba. Also the other battery units BU include a charger or charging circuit, a discharger or discharging circuit and a battery. In the following description, when there is no necessity to distinguish each battery, it is referred to suitably as battery B.

The charger circuit 41a converts the voltage V12 supplied thereto from the control unit CU into a voltage applicable to the battery Ba. The battery Ba is charged based on the voltage obtained by the conversion. It is to be noted that the charger circuit 41a changes the charge rate into the battery Ba in response to a fluctuation of the voltage V12.

Electric power outputted from the battery Ba is supplied to the discharger circuit 42a. From the battery Ba, for example, a DC voltage within a range from substantially from 12 to 55 V is outputted. The DC voltage supplied from the battery Ba is converted into a DC voltage V13 by the discharger circuit 42a. The voltage V13 is a DC voltage of, for example, 48 V. The voltage V13 is outputted from the discharger circuit 42a to the control unit CU through the electric power line L2. It is to be noted that the DC voltage outputted from the battery Ba may otherwise be supplied directly to an external apparatus without by way of the discharger circuit 42a.

Each battery B may be a lithium-ion battery, an olivine-type iron phosphate lithium-ion battery, a lead battery or the like. The batteries B of the battery units BU may be those of different battery types from each other. For example, the battery Ba of the cattery unit BUa and the battery Bb of the battery unit BUb are configured, from a lithium-ion battery and the battery Bc of the battery unit BUc is configured from a lead battery. The number and the connection scheme of battery cells in the batteries B can be changed suitably. A plurality of battery cells may be connected in series or in parallel. Or series connections of a plurality of battery cells may be connected in parallel.

When the battery units discharge, in the case where the load is light, the highest one of the output voltages of the battery units is supplied as the voltage via to the electric power line L2. As the load becomes heavier, the outputs of the battery units are combined, and the combined output is supplied to the electric power line L2. The voltage V13 is supplied to the control unit CU through the electric power line L2. The voltage V13 is outputted from an output port of the control unit CU. To the control unit CU, electric power can be supplied in a distributed relationship from the battery units BU. Therefore, the burden on the individual battery units BU can be moderated.

For example, the following use form stay be available. The voltage V13 outputted from the battery unit BUa is supplied to an external apparatus through the control unit CU. To the battery unit BUb, the voltage V12 is supplied from the control unit CU, and the batter Bb of the battery unit BUb is charged. The battery unit BUc is used as a redundant power supply. For example, when the remaining capacity of the battery unit BUa drops, the battery unit to be used is changed over from the battery unit BUa to the battery unit BUc and the voltage V13 outputted from the battery unit BUc is supplied to the external apparatus. Naturally, the use form described is an example, and the use form of the control system 1 is not limited to this specific use form.

[Internal Configuration of the Control Unit]

Figure 2:
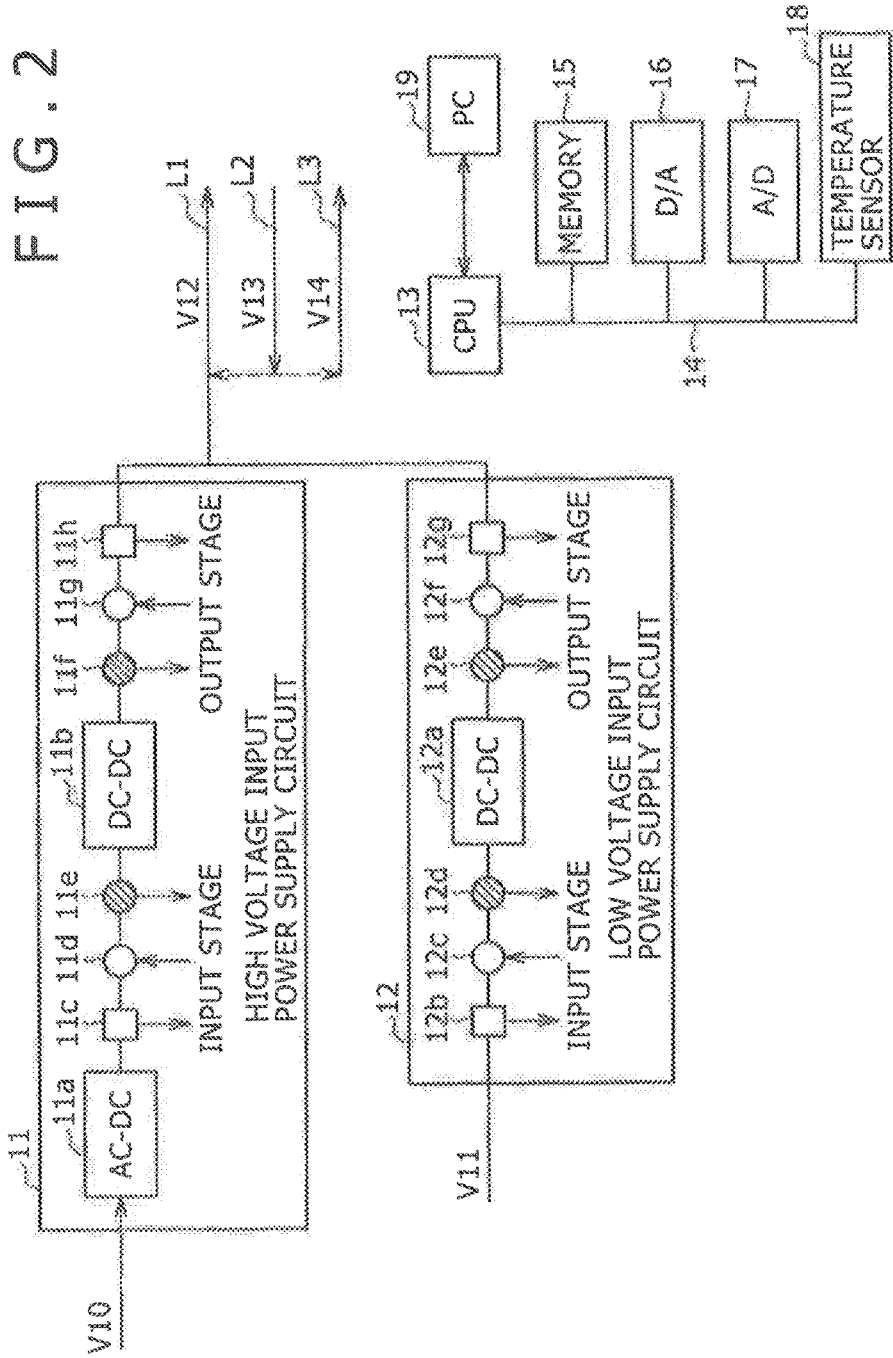
FIG. 2 is a block diagram showing an example of a configuration of a control unit.

FIG. 2 shows an example of an internal configuration of the control unit CU. As described hereinabove, the control unit CU includes the high voltage input power supply circuit 11 and the low voltage input power supply circuit 12. Referring to FIG. 2, the high voltage input power supply circuit 11 includes an AC-DC converter 11a for converting an AC input to a DC output, and a DC-DC converter 11b for stepping down the voltage V10 to a DC voltage within, the range from 45 to 48 V. The AC-DC converter 11a and the DC-DC converter 11b may be those of known types. It is to be noted that, in the case where only a DC voltage is supplied to the high voltage input power supply circuit 11, the AC-DC converter 11a may be omitted.

A voltage sensor, an electronic switch and a current sensor are connected to each or an input stage and an output stage of the DC-DC converter 11b. In FIG. 2 and also in FIG. 5 hereinafter described, the voltage sensor is represented by a square mark; the electronic switch by a round mark; and the current sensor by a round mark with slanting lines individually in a simplified representation. In particular, a voltage sensor 11c, an electronic switch 11d and a current sensor 11e are connected to the input stage of the DC-DC converter 11b. A current sensor 11f, an electronic switch 11g and a voltage sensor 11h are connected to the output stage of the DC-DC converter 11b. Sensor information obtained by the censors is supplied to a CPU (Central Processing Unit) 13 hereinafter described. On/off operations of the electronic switches are controlled by the CPU 13.

The low voltage input power supply circuit 12 includes a DC-DC converter 12a for stepping up the voltage V11 to a DC voltage within the range from 45 to 48 V. A voltage sensor, an electronic switch and a current sensor are connected to each of an input stage and an output stage of the low voltage input power supply circuit 12. In particular, a voltage sensor 12b, an electronic switch 12c and a current sensor 12d are connected to the input stage of the DC-DC converter 12a. A current sensor 12e, an electronic switch 12f and a voltage sensor 12g are connected to the output stage of the DC-DC converter 12a. Sensor information obtained by the sensors is supplied to the CPU 13. On/off operations of the switches are controlled by the CPU 13.

It is to be noted that, in FIG. 2, an arrow mark extending from a sensor represents that sensor information is supplied to the CPU 13. An arrow mark extending to an electronic switch represents that the electronic switch is controlled by the CPU 13.

An output voltage of the high voltage input cower supply circuit 11 is outputted through a diode. An output voltage of the low voltage input power supply circuit 12 is outputted through another diode. The output voltage of the high voltage input power supply circuit 11 and the output voltage of the low voltage input power supply circuit 12 are combined, and the combined voltage V12 is outputted to the battery unit BU through the electric power line L1. The voltage V13 supplied from the battery unit BU is supplied to the control unit CU through the electric power line L2. Then, the voltage V13 supplied to the control unit CU is supplied to the external apparatus through an electric power line L3. It is to be noted that, in FIG. 2, the voltage supplied to the external apparatus is represented as voltage V14.

The electric power line L3 may be connected to the battery units BU. By this configuration, for example, a voltage outputted from the battery unit BUa is supplied to the control unit CU through the electric power line L2. The supplied voltage is supplied to the battery unit BUb through the electric power line L3 and can charge the battery unit BUb. It is to be noted that, though not shown, power supplied to the control unit CU through the electric power line L3 may be supplied to the electric power line L1.

The control unit CU includes the CPU 13. The CPU 13 controls the components of the control unit CU. For example, the CPU 13 switches on/off the electronic switches of the high voltage input power supply circuit 11 and the low voltage input power supply circuit 12. Further, the CPU 13 supplies control signals to the battery units BU. The CPU 13 supplies to the battery units BU a control signal for turning on the power supply to the battery units BU or a control signal for instructing the battery units BU to charge or discharge. The CPU 13 can output control signals of different contents to the individual battery units BU.

The CPU 13 is connected to a memory 15, a D/A (Digital to Analog) conversion section 16, an A/D (Analog to Digital) conversion section 17 and a temperature sensor 18 through a bus 14. The bus 14 is configured, for example, from an $I^2C$ bus. The memory 15 is configured from a nonvolatile memory such as an EEPROM (Electrically Erasable and Programmable Read Only Memory). The D/A conversion section 16 converts digital signals used in various processes into analog signals.

The CPU 13 receives sensor information measured by the voltage sensors and the current sensors. The sensor information is inputted to the CPU 13 after it is converted into digital signals by the A/D conversion section 17. The temperature sensor 18 measures an environmental temperature. For example, the temperature sensor 18 measures a temperature in the inside of the control unit CU or a temperature around the control unit CU.

The CPU 13 may have a communication function. For example, the CPU 13 and a personal computer (PC) 19 may communicate with each other. The CPU 13 may communicate not only with the personal computer but also with an apparatus connected to a network such as the Internet.

[Power Supply System of the Control Unit]

Figure 3:
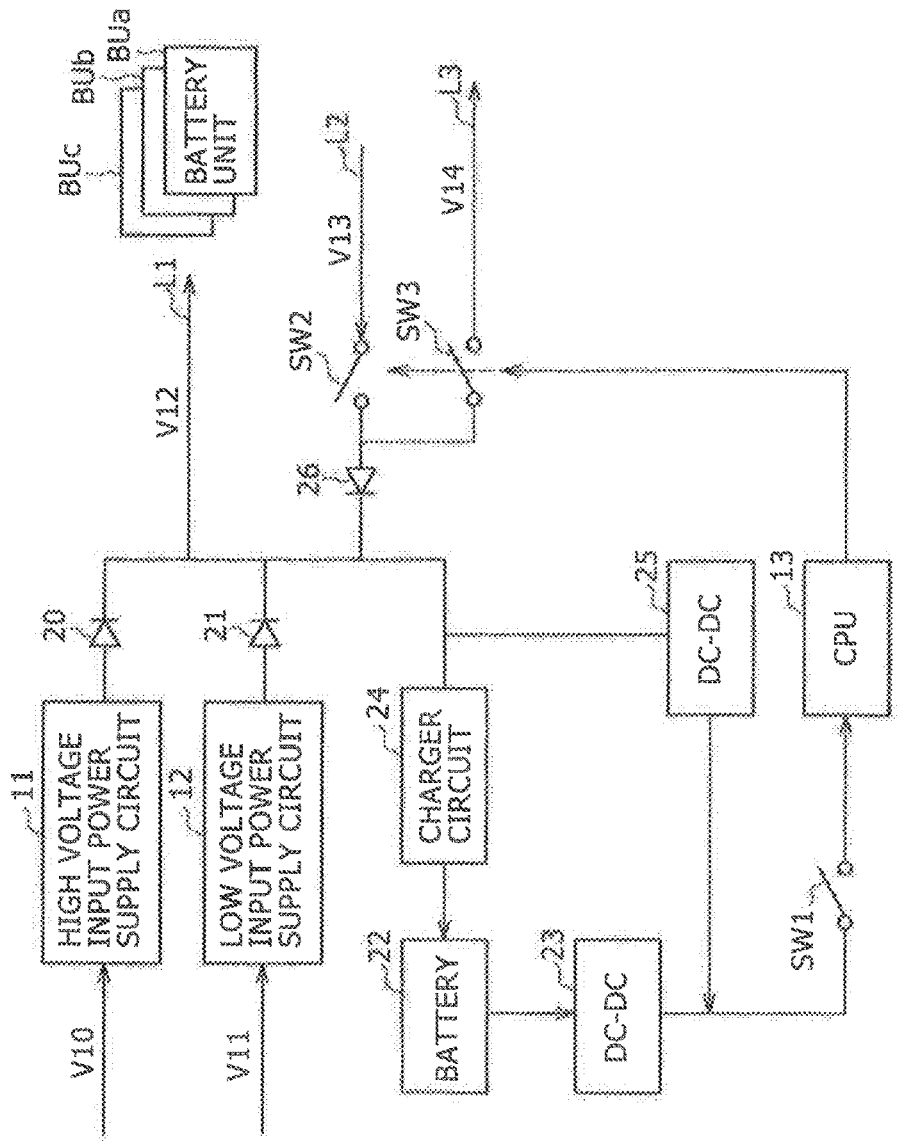
FIG. 3 is a block diagram showing an example of a configuration of a power supply system of the control unit.

FIG. 3 principally shows an example of a configuration of the control unit CU which relates to a power supply system. A diode 20 for the backflow prevention is connected to the output stage of the high voltage input power supply circuit 11. Another diode 21 for the backflow prevention is connected to the output stage of the ice voltage input power supply circuit 12. The high voltage input power supply circuit 31 and the low voltage input power supply circuit 12 are connected to each other by OR connection by the diode 20 and the diode 21. Outputs of the high voltage input power supply circuit 11 and the low voltage input power supply circuit 12 are combined and supplied to the battery unit BU. Actually, that one of the outputs of the high voltage input power supply circuit 11 and the low voltage input power supply circuit 12 which exhibits a higher voltage is supplied to the battery unit BU. However, also a situation in which the electric power from both of the high voltage input power supply circuit 11 and the low voltage input power supply circuit 12 is supplied is entered in response to the power consumption of the battery unit BU which serves as a load.

The control unit CU includes a main switch SW1 which can be operated by a user. When the main switch SW1 is switched on, electric power is supplied to the CPU 13 to start up the control unit CU. The electric power is supplied to the CPC 13, for example, from a battery 22 built in the control unit CU. The battery 22 is a rechargeable battery such as a lithium-ion battery. A DC voltage from the battery 22 is converted into a voltage, with which the CPU 13 operates, by a DC-DC converter 23. The voltage obtained by the conversion is supplied as a power supply voltage to the CPU 13. In this manner, upon start-up of the control unit CU, the battery 22 is used. The battery 22 is controlled, for example, by the CPU 13.

The battery 22 can be charged by electric power supplied from the high voltage input power supply circuit 11 or the low voltage input power supply circuit 12 or otherwise from the battery units BU. Electric power supplied from the battery units BU is supplied to a charger circuit 24. The charger circuit 24 includes a DC-DC converter. The voltage V13 supplied from the battery units BU is converted into a DC voltage of a predetermined level by the charger circuit 24. The DC voltage obtained by the conversion is supplied to the battery 22. The battery 22 is charged by the DC voltage supplied thereto.

It is to be noted that the CPU 13 may operate with the voltage V13 supplied thereto from the high voltage input power supply circuit 11, low voltage input power supply circuit 12 or battery units BU. The voltage V13 supplied from the battery units BU is converted into a voltage of a predetermined level by a DC-DC converter 25. The voltage obtained by the conversion is supplied as a power supply voltage to the CPU 13 so that the CPU 13 operates.

After the control unit CU is started up, if at leant one of the voltages V10 and V11 is inputted, then the voltage V12 is generated. The voltage V12 is supplied to the battery units BU through the electric power line L1. At this time, the CPU 13 uses the signal line SL to communicate with the battery units BU. By this communication, the CPU 13 outputs a control signal for instructing the battery units BU to start up and discharge. Then, the CPU 13 switches on a switch SW2. The switch SW2 is configured, for example, from an FET (Field Effect Transistor). Or the switch SW2 may be configured from an IGBT (Insulated Gate Bipolar Transistor). When the switch SW2 is on, the voltage V13 is supplied from the battery units BU to the control unit CU.

A diode 26 for the backflow prevention is connected to the output side of the switch SW2. The connection of the diode 26 can prevent unstable electric power, which is supplied from a solar battery or a wind power generation source, from being supplied directly to the external apparatus. Thus, stabilized electric power supplied from the battery units BU can be supplied to the external apparatus. Naturally, a diode may be provided on the final stage of the battery units BU in order to secure the safety.

In order to supply the electric power supplied from the battery units BU to the external apparatus, the CPU 13 switches on a switch SW3, When the switch SW3 is switched on, the voltage V14 based on the voltage V13 is supplied to the external apparatus through the electric power line L3. It is to be noted that the voltage V14 may be supplied to the other battery units BU so that the batteries B of the other battery units BU are charged by the voltage V14.

[Example of the Configuration of the High Voltage Input Power Supply Circuit]

Figure 4:
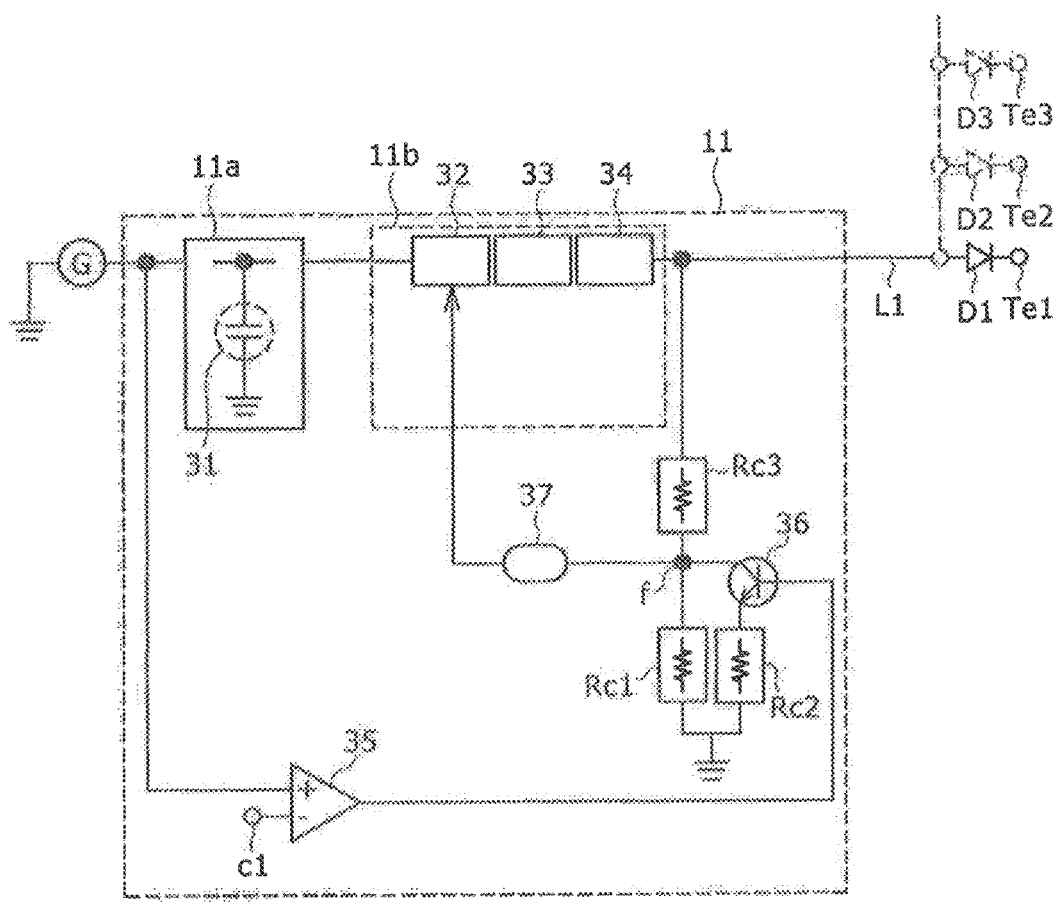
FIG. 4 is a circuit diagram showing an example of a particular configuration of a high voltage input power supply circuit of the control unit.
Figure 14:
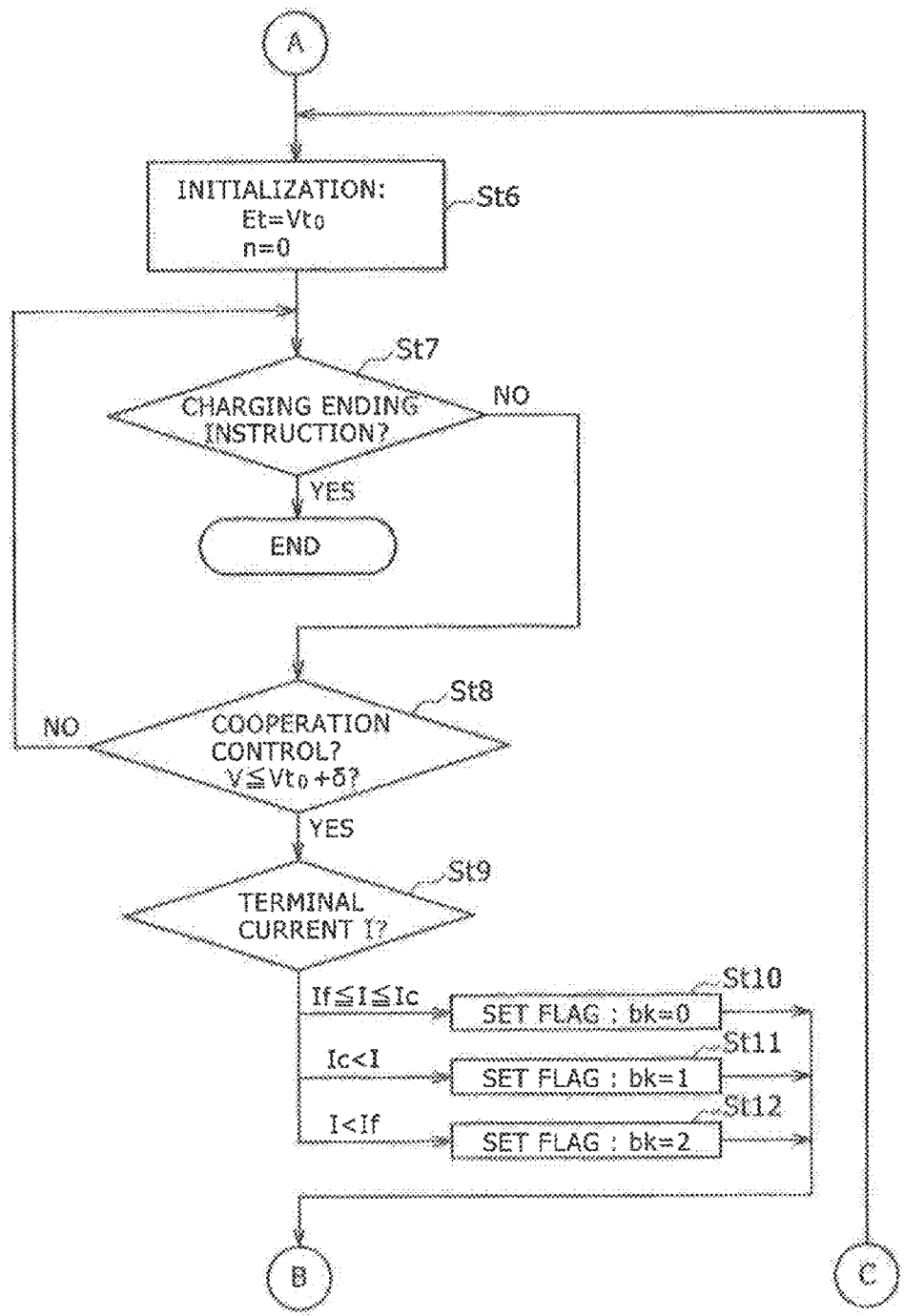

FIG. 4 shows an example of a particular configuration of the high voltage input power supply circuit. Referring to FIG. 14, the high voltage input power supply circuit 11 includes the DC-PC converter 11b and a feedforward controlling system hereinafter described. In FIG. 4, the voltage sensor 11c, electronic switch 11d, current sensor 11e, current sensor 11f, electronic switch 11g and voltage sensor 11h as well as the diode 20 and so forth are not shown.

The low voltage input power supply circuit 12 is configured substantially similarly to the high voltage input power supply circuit 11 except that the DC-DC converter 12a is that of the step-up type.

The DC-DC converter 11b is configured from a primary side circuit 32 including, for example, a switching element, a transformer 33, and a secondary side circuit 34 including a rectification element and so forth. The DC-DC converter 11b shown in FIG. 4 is that of the current resonance type, namely, an LLC resonance converter.

The feedforward controlling system includes an operational amplifier 35, a transistor 36 and resistors Rc1, Rc2 and Rc3. An output of the feedforward controlling system is inputted to a controlling terminal provided on a driver of the primary side circuit 32 of the DC-DC converter 11b. The DC-DC converter 11b adjusts the output voltage from the high voltage input power-supply circuit 11 so that the input voltage to the controlling terminal may be fixed.

Since the high voltage input power supply circuit 11 includes the feedforward controlling system, the output voltage from the high voltage input power supply circuit 11 is adjusted so that the value thereof may become a voltage value within a range set in advance. Accordingly, the control unit CU including the high voltage input power supply circuit 11 has a function of a voltage conversion apparatus which varies the output voltage, for example, in response to a change of the input voltage from a solar cell or the like.

As seen in FIG. 4, an output voltage is extracted from the high, voltage input power supply circuit 11 through the AC-DC converter 11a including a capacitor 31, primary side circuit 32, transformer 33 and secondary side circuit 34. The AC-DC converter 11a is a power factor correction circuit disposed where the input to the control unit CU from the outside is an AC power supply.

The output from the control unit CU is sent to the battery units BU through the electric power line L1, For example, the individual battery units BUa, Bub and BUc are connected to output terminals Te1, Te2, Te3, . . . through diodes D1, D2, D3, . . . for the backflow prevention, respectively.

In the following, the feedforward controlling system provided in the high voltage input power supply circuit 11 is described.

A voltage obtained by stepping down the input voltage to the high voltage input power supply circuit 11 to kc times, where kc is approximately one several tenth or one hundredth, is inputted to the non-negated input terminal of the operational amplifier 33. Meanwhile, to the negated input terminal c1 of the operational amplifier 35, a voltage obtained by stepping down a fixed voltage $Vt_0$ determined in advance to kc times is inputted. The input voltage $kc \times Vt_0$ to the negated input terminal c1 of the operational amplifier 35 is applied, for example, from the D/A conversion section 16. The value of the voltage $Vt_0$ is retained in a built-in memory of the D/A conversion section 16 and can be changed as occasion demands. The value of the voltage $Vt_0$ may otherwise be retained into the memory 15 connected to the CPU 13 through the bus 14 such tout it is transferred to the D/A conversion section 16.

The output terminal of the operational amplifier 35 is connected to the base of the transistor 36, and voltage-current conversion is carried out in response to the difference between the input voltage to the non-negated input terminal and the input voltage to the negated input terminal of the operational amplifier 35 by the transistor 36.

The resistance value of the resistor Rc2 connected to the emitter of the transistor 36 is higher than the resistance value of the resistor Rc1 connected in parallel to the resistor Rc2.

It is assumed that, for example, the input voltage to the high voltage input power supply circuit 11 is sufficiently higher than the fixed voltage $Vt_0$ determined in advance. At this time, since the transistor 30 is in an on state, and the value of the combined resistance of the resistor Rc1 and the resistor Rc2 is lower than the resistance value of the resistor Rc1, the potential at a point f shown in FIG. 4 approaches due ground potential.

Consequently, the input voltage to the controlling terminal provided on the driver of the primary side circuit 32 and connected to the point f through a photocoupler 37 drops. The DC-DC converter 11b which detects the drop of the input voltage to the controlling terminal steps up the output voltage from the high voltage input power supply circuit 11 so that the input voltage to the controlling terminal may be fixed.

It is assumed now that, for example, the terminal voltage of the solar cell connected to the control unit CU drops conversely and the input voltage to the high voltage input power supply circuit 11 approaches the fixed voltage $Vt_0$ determined advance.

As the input voltage to the high voltage input power supply circuit 11 drops, the state of the transistor 36 approaches an off state from an on state. As the state of the transistor 36 approaches an off state from an on state, current becomes less likely to flow to the resistor Rc1 and the resistor Rc2, and the potential at the point f shown in FIG. 4 rises.

Consequently, the input voltage to the controlling terminal provided on the driver of the primary side circuit 32 as brought out of a state in which it is kept fixed. Therefore, the DC-DC converter 11b steps down the output voltage from the high voltage input power supply circuit 11 so that the input voltage to the controlling terminal may be fixed.

In other words, in the case where the input voltage is sufficiently higher than the fixed voltage $Vt_0$ determined advance, the high voltage input power supply circuit 11 steps up the output voltage. On the other hand, if the terminal voltage of the solar cell drops and the input voltage approaches the fixed voltage $Vt_0$ determined in advance, then the high voltage input power supply circuit 11 steps down the output voltage. In this manner, the control unit CU including the high voltage input power supply circuit 11 dynamically changes the output voltage in response to the magnitude of the input voltage.

Furthermore, as hereinafter described, the high voltage input power supply circuit 11 dynamically changes the output voltage also in response to a change of the voltage required on the output side of the control unit CU.

For example, it is assumed that the number of those battery units BU which are electrically connected to the control unit CU increases during electric generation of the solar cell. In other words, it is assumed that the load as viewed from the solar cell increases during electric generation of the solar cell.

In this instance, a battery unit BU is electrically connected additionally to the control unit CU, and consequently, the terminal voltage of the solar cell connected no the control unit CU drops. Then, when the input voltage to the high voltage input power supply circuit 11 drops, the state of the transistor 36 approaches an off stats from an on state, and the output voltage from the high voltage input power supply circuit 11 is stepped down.

On the other hand, if it is assumed that the number of those battery units BU which are electrically connected to the control unit CU decreases during electric generation of the solar cell, then the load as viewed from the solar cell decreases. Consequently, the terminal voltage of the solar cell connected to the control unit CU rises. If the input voltage to the high voltage input power supply circuit 11 becomes sufficiently higher than the fixed voltage $Vt_0$ determined in advance, then the input voltage to the controlling terminal provided on the driver of the primary aide circuit 32 drops. Consequently, the output voltage from the high voltage input power supply circuit 11 is stepped up.

It is to be noted that the resistance values of the resistors Rc1, Rc2 and Rc3 are selected suitably such that the value of the output voltage of the high voltage input power supply circuit 11 may be included in a range set in advance. In other words, the upper limit to the output voltage from the high voltage input power supply circuit 11 is determined by the resistance values of the resistors Rc1 and Rc2. The transistor 36 is disposed so that, when the input voltage to the high voltage input power supply circuit 11 is higher than the predetermined value, the value of the output voltage from the high voltage input power supply circuit 11 may not exceed the voltage value of the upper limit set in advance.

On the other hand, the lower limit to the output voltage from the high voltage input power supply circuit 11 is determined by the input voltage to the non-negated input terminal of an operational amplifier of a feedforward controlling system of the charger circuit 41a as hereinafter described.

[Internal Configuration of the Battery Unit]

Figure 5:
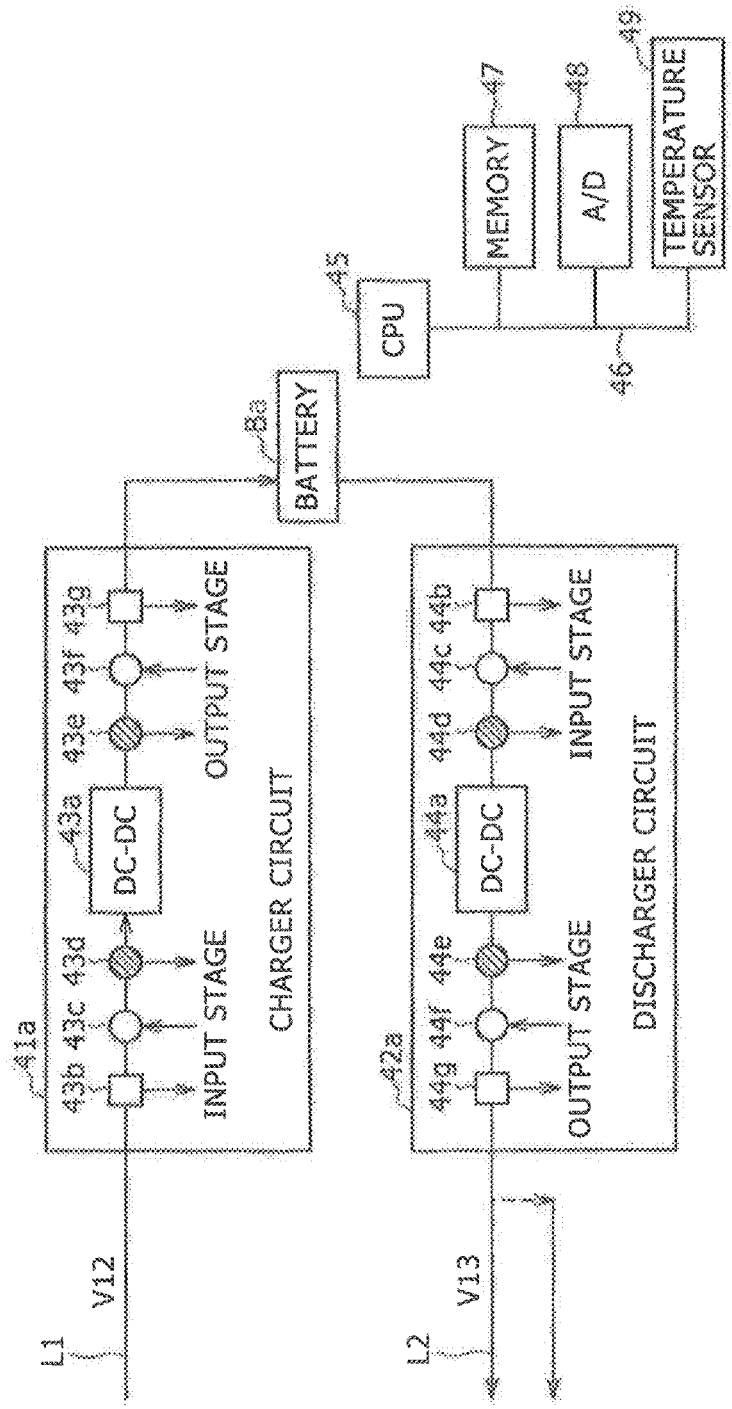
FIG. 5 is a block diagram showing an example of a configuration of a battery unit.

FIG. 5 shows an example of an internal configuration of the battery units BU. Here, description is given taking the battery unit BUa as an example. Unless otherwise specified, the battery unit BUb and the battery unit BUc have a configuration similar to that of the battery unit BUa.

Referring to FIG. 5, the battery unit BUa includes a charger circuit 41a, a discharger circuit 42a and a battery Ba. The voltage V12 is supplied from the control unit CU to the charger circuit 41a. The voltage V13 which is an output from the battery unit BUa is supplied to the control unit CU through the discharger circuit 42a. The voltage V13 may otherwise be supplied directly to the external apparatus from the discharger circuit 42a.

The charger circuit 41a includes a DC-DC converter 43a. The voltage V12 inputted to the charger circuit 41a is converted into a predetermined voltage by the DC-DC converter 43a. The predetermined voltage obtained by the conversion is supplied to the battery Ba to charge the battery Ba. The predetermined voltage differs depending upon the type and so forth of the battery Ba. To the input stage of the DC-DC converter 43a, a voltage sensor 43b, an electronic swatch 43c and a current sensor 43d are connected. To the output stage of the DC-DC converter 43a, a current sensor 43e, an electronic switch 43f and a voltage sensor 43c are connected.

The discharger circuit 42a includes a DC-DC converter 44a. The DC voltage supplied from the battery Ba to the discharger circuit 42a is converted into the voltage V13 by the DC-DC converter 44a. The voltage V13 obtained by the conversion is outputted from the discharger circuit 42a. To the input stage of the DC-DC converter 44a, a voltage sensor 44b, an electronic switch 44c and a current sensor 44c are connected. To the output stage of the DC-DC converter 44a, a current sensor 44e, an electronic switch 44f and a voltage sensor 44g are connected.

The battery unit BUa includes a CPU 45. The CPU 45 controls the components of the battery unit BU. For example, the CPU 45 controls on/off operations of the electronic switches. The CPU 45 may carry out processes for assuring the safety of the battery B such as an overcharge preventing function and an excessive current preventing function. The CPU 45 is connected to a bus 46. The bus 46 may be, for example, an I²C bus.

To the bus 16, a memory 47, an A/D conversion section 48 and a temperature sensor 49 are connected. The memory 47 is a rewritable nonvolatile memory such as, for example, an EEPROM. The A/D conversion section 48 converts analog sensor information obtained by the voltage sensors and the current sensors into digital information. The sensor Information converted into digital signals by the A/D conversion section 48 is supplied to the CPU 45. The temperature sensor 49 measures the temperature at a predetermined place in the battery unit BU. Particularly, the temperature sensor 49 measures, for example, the temperature of the periphery of a circuit board on which the CPU 45 is mounted, the temperature of the charger circuit 41a and the discharger circuit 42a and the temperature of the battery Ba.

[Power Supply System of the Battery Unit]

Figure 6:
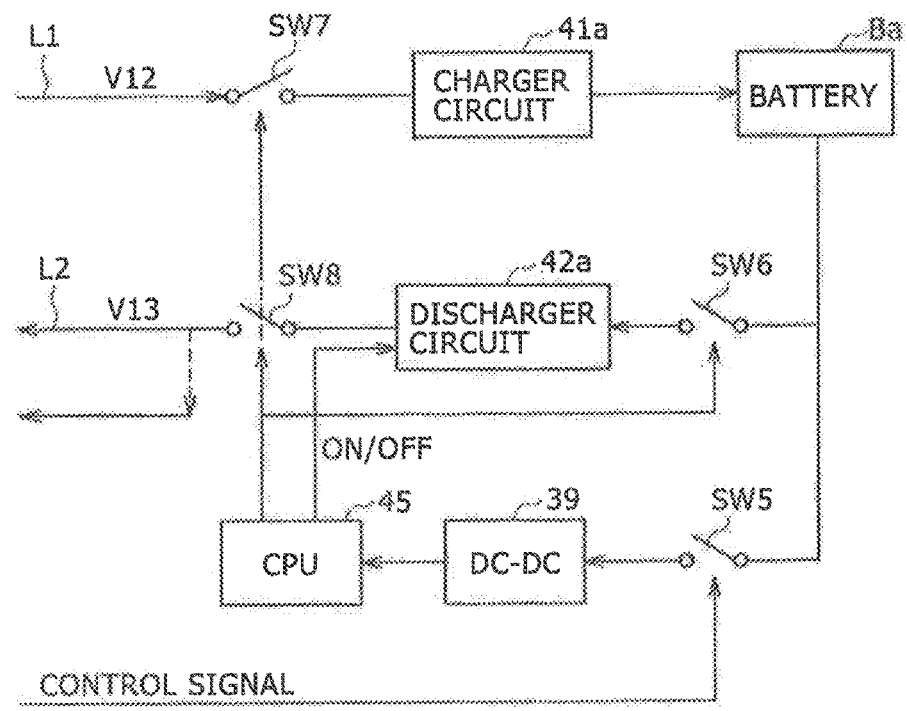
FIG. 6 is a block diagram showing an example of a configuration of a power supply system of one battery unit.

FIG. 6 snows an example of a configuration of the battery unit BUa principally relating to a power supply system. Referring to FIG. 6, the battery unit BUa does not include a main switch. A switch SW5 and a DC-DC converter 39 are connected between the battery Ba and the CPU 45. Another switch SW6 is connected between the battery Ba and the discharger circuit 42a. A further switch SW7 is connected to the input stage of the charger circuit 41a. A still further switch SW8 is connected to the output stage of the discharger circuit 42a. The swatches SW are configured, for example, from an FET.

The battery unit BUa is started up, for example, by a control signal from the control unit CU. A control signal, for example, of the high level is normally supplied from the control unit CU to the battery unit BUa through a predetermined signal line. Therefore, only by connecting a port of the battery unit BUa to the predetermined signal line, the control signal of the high level is supplied to the switch SW5 making the switch SW5 in an on state to start up the battery unit BUa. When the switch SW5 is on, a DC voltage from the battery Ba is supplied to the DC-DC converter 39. A power supply voltage for operating the CPU 45 is generated by the DC-DC converter 33. The generated power supply voltage is supplied to the CPU 45 to operate the CPU 45.

The CPU 45 executes control in accordance with an instruction of the control unit CU. For example, a control signal for the instruction to charge is supplied from the control unit CU to the CPU 45. In response to the instruction to charge, the CPU 45 switches off the switch SW6 and the switch SW8 and then switches on the switch SW7. When the switch SW7 is on, the voltage V12 supplied from the control unit CU is supplied to the charger circuit 41a. The voltage V12 is converted into a predetermined voltage by the charger circuit 41a, and the battery Ba is charged by the predetermined voltage obtained by the conversion. It is to be noted that the charging method into the battery B can be changed suitably in response to the type of the battery B.

For example, a control signal for the instruction to discharge is supplied from the control unit CU to the CPU 45. In response to the instruction to discharge, the CPU 45 switches off the switch SW7 and switches on the switches SW5 and SW8. For example, the switch SW8 is switched on after a fixed interval of time after the switch SW6 is switched on. When the switch SW6 is on, the DC voltage from the battery Ba is supplied to the discharger circuit 42a. The DC voltage from the battery Ba is converted into the voltage V13 by the discharger circuit 42a. The voltage V13 obtained by the conversion is supplied to the control unit CU through the switch SW8. It is to be noted that, though not shown, a diode may be added to a succeeding stage to the switch SW8 in order to prevent the output of the switch SW8 from interfering with the output from a different one of the battery units BU.

It is to be noted that the discharger circuit 42a can be changed over between on and off by control of the CPU 45. In this instance, an ON/OFF signal line extending from the CPU 45 to the discharger circuit 42a is used. For example, a switch SW not shown is provided on the output side of the switch SW6. The switch SW in this instance is hereinafter referred to as switch SW10 taking the convenience in description into consideration. The switch SW10 carries out changeover between a first path which passes the discharger circuit 42a and a second path which does not pass the discharger circuit 42a.

In order to turn on the discharger circuit 42a, the CPU 45 connects the switch SW10 to the first path. Consequently, an output from the switch SW6 is supplied to the switch SW8 through the discharger circuit 42a. In order to turn off the discharger circuit 42a, the CPU 45 connects the switch SW10 to the second path. Consequently, the output from the switch is supplied directly to the switch SW8 without by way of the discharger circuit 42a.

[Example of the Configuration of the Charger Circuit]

Figure 7:
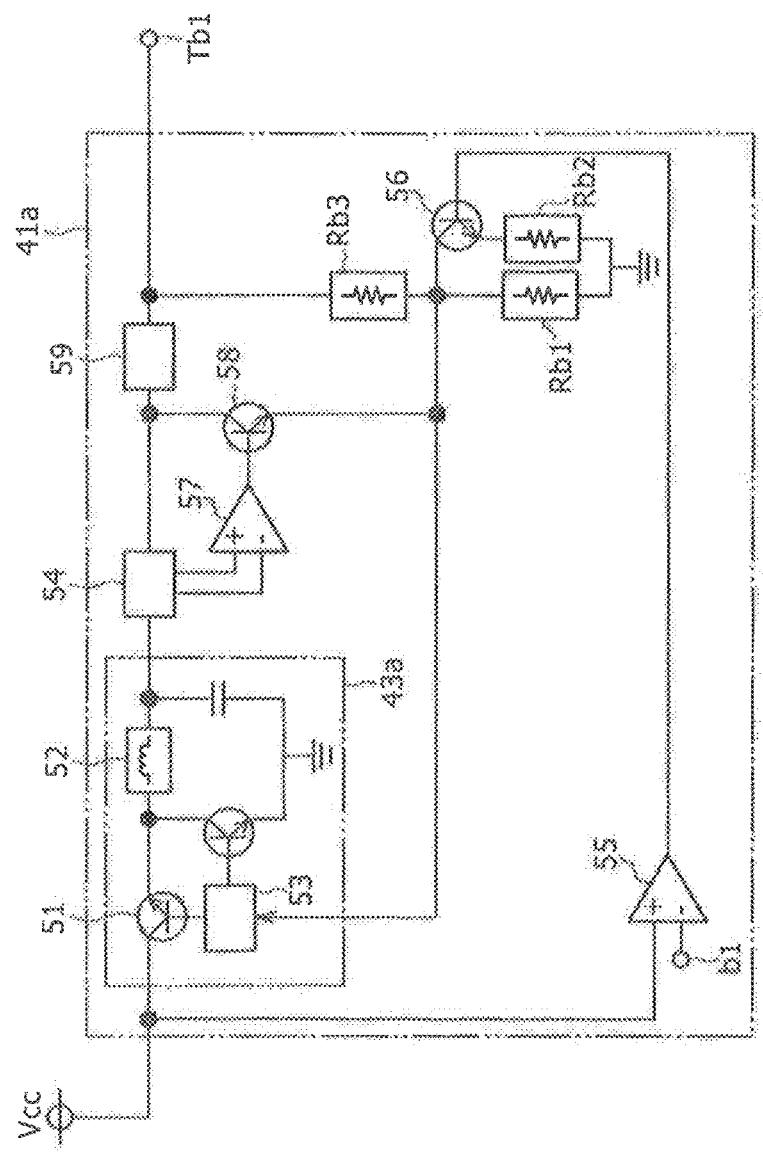
FIG. 7 is a circuit diagram showing an example of a particular configuration of a charger circuit of the battery unit.

FIG. 7 shows an example of a particular configuration of the charger circuit of the battery unit. Referring to FIG. 7, the charger circuit 41a includes a DC-DC converter 43a, and a feedforward controlling system and a feedback controlling system hereinafter described. It is to be noted that, in FIG. 7, the voltage sensor 43b, electronic switch 43c, current sensor 43d, current sensor 43e, electronic switch 43f, voltage sensor 43g, switch SW7 and so forth are not shown.

Also the charger circuits of the battery units BU have a configuration substantially similar to that of the charger circuit 11a shown in FIG. 7.

The DC-DC converter 43a is configured, for example, from a transistor 51, a coil 52, a controlling IC (Integrated Circuit) 53 and so forth. The transistor 51 is controlled by the controlling IC 53.

The feedforward controlling system includes an operational amplifier 55, a transistor 56, and resistors Rb1, Rb2 and Rb3 similarly to the high voltage input power supply circuit 11. An output of the feedforward controlling system is inputted, for example, to a controlling terminal provided on the controlling IC 53 of the DC-DC converter 43a. The controlling IC 53 in the DC-DC converter 43a adjusts the output voltage from the charger circuit 41a so that the input voltage to the controlling terminal may be fixed.

In other words, the feedforward controlling system provided, in the charger circuit 41a acts similarly to the feedforward controlling system provided in the high voltage input power supply circuit 11.

Since the charger circuit 41a includes the feedforward controlling system, the output voltage from the charger circuit 41a is adjusted so that the value thereof may become a voltage value within a range set in advance. Since the value of the output voltage from the charger circuit is adjusted to a voltage value within the range set in advance, the charging current, to the batteries B electrically connected to the control unit CU is adjusted in response to a change of the input voltage from the high voltage input power supply circuit 11. Accordingly, the battery units BU which include the charger circuit have a function of a charging apparatus which changes the charge rate to the batteries B.

Since the charge rate to the batteries B electrically connected to the control unit CU is changed, the value of the input voltage to the charger circuits of the battery units BU, or in other words, the value of the output voltage of the high voltage input power supply circuit 11 or the low voltage input power supply circuit 12, is adjusted so as to become a voltage value within the range set in advance.

The input to the charger circuit 41a is an output, for example, from the high voltage input power supply circuit 11 or the low voltage input power supply circuit 12 of the control unit CU described hereinabove. Accordingly, one of the output terminals Te1, Te2, Te3, . . . shown in FIG. 4 and the input terminal of the charger circuit 41a are connected to each other.

As seen in FIG. 7, an output voltage from the charger circuit 41a is extracted through the DC-DC converter 43a, a current sensor 54 and a filter 59. The battery Ba is connected to a terminal Tb1 of the charger circuit 41a. In other words, the output from the charger circuit 41a is used as an input to the battery Ba.

As hereinafter described, the value of the output voltage from each charger circuit is adjusted so as to become a voltage value within the range set in advance in response to the type of the battery connected to the charger circuit. The range of the output voltage from each charger circuit is adjusted by suitably selecting the resistance value of the resistors Rb1, Rb2 and Rb3.

Since the range of the output voltage from each charger circuit is determined individually in response to the type of the battery connected to the charger circuit, the type of the batteries B provided in the battery units BU is not limited specifically. This is because the resistance values of the resistors Rb1, Rb2 and Rb3 in the charger circuits may be suitably selected in response to the type of the batteries B connected thereto.

It is to be noted that, while the configuration wherein the output of the feedforward controlling system is inputted to the controlling terminal of the controlling IC 53 is shown in FIG. 7, the CPU 45 of the battery units BU may supply an input to the controlling terminal of the controlling IC 53. For example, the CPU 43 of the battery unit BU may acquire information relating to the input voltage to the battery unit BU from the CPU 13 of the control unit CU through the signal line SL. The CPU 13 of the control unit CU can acquire information relating to the input voltage to the battery unit BU from a result of measurement of the voltage sensor 11h or the voltage sensor 12g.

In the following, the feedforward controlling system provided in the charger circuit 41a is described.

The input to the non-negated input terminal of the operational amplifier 55 is a voltage obtained by stepping down the input voltage to the charger circuit 41a to kb times, where kb is approximately one several tenth to one hundredth. Meanwhile, the input to the negated input terminal b1 of the operational amplifier 55 is a voltage obtained by stepping down a voltage Vb, which is to be set as a lower limit to the output voltage from the high voltage input power supply circuit 11 or the low voltage input power supply circuit 12, to kb times. The input voltage kb×Vb to the negated input terminal b1 of the operational amplifier 55 is applied, for example, from the CPU 45.

Accordingly, the feedforward controlling system provided in the charger circuit 41a steps up the output voltage from the charger circuit 41a when the input voltage to the charger circuit 11a is sufficiently higher than the fixed voltage Vb determined in advance. Then, when the input voltage to the charger circuit 41a approaches the fixed voltage Vb determined in advance, the feedforward controlling system steps down the output voltage from the charger circuit 41a.

The transistor 58 is disposed so that, when the input voltage to the charger circuit 41a is higher than the predetermined value, the value of the output voltage from the charger circuit 41a may not exceed an upper limit set in advance similarly to the transistor 36 described hereinabove with reference to FIG. 4. It is to be noted that the range of the value of the output voltage from the charger circuit 41a depends upon the combination of the resistance values of the resistors Rb1, Rb2 and Rb3. Therefore, the resistance values of the resistors Rb1, Rb2 and Rb3 are adjusted in response to the type of the batteries B connected to the charger circuits.

Further, the charger circuit 41a includes also the feedback controlling system as described hereinabove. The feedback controlling system is configured, for example, from a current sensor 54, an operational amplifier 57, a transistor 58 and so forth.

If the current amount supplied to the battery 3a exceeds a prescribed value set in advance, than the output voltage from the charger circuit 41a is stepped down by the feedback controlling system, and the current amount supplied to the battery Ba is limited. The degree of the limitation to the current amount to be supplied to the battery Ba is determined in accordance with a rated value of the battery B connected to each charger circuit.

If the output voltage from the charger circuit 41a is stepped down by the feedforward controlling system or the feedback controlling system, then the current amount to be supplied to the battery Ba is limited. When the current amount supplied to the battery Ba is limited, as a result, charging into the battery Ba connected to the charger circuit 41a is decelerated.

Now, in order to facilitate understandings of the embodiment of the present disclosure, a control method is described taking the MPPT control and control by the voltage tracking method as an example.

[MPPT Control]

First, an outline of the MPPT control is described below.

Figure 8A:
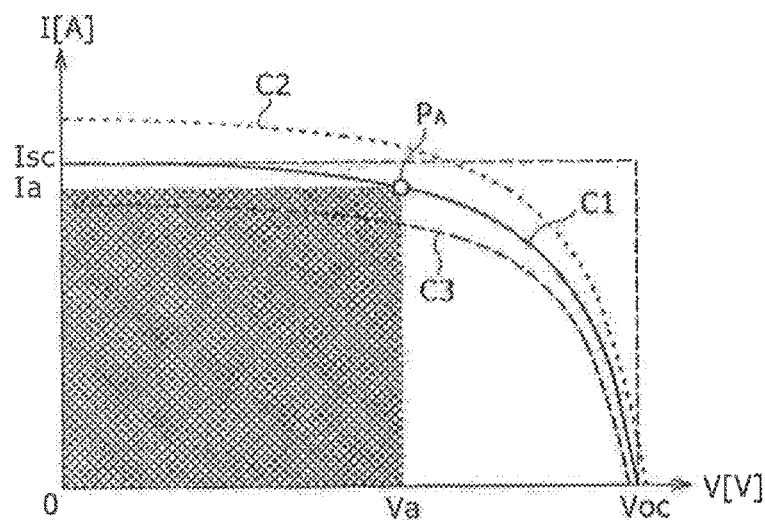
FIG. 8A is a graph illustrating a voltage-current characteristics of a solar cell.

FIG. 8A is a graph illustrating a voltage-current characteristic of a solar cell. In FIG. 8A, the axis of ordinate represents the terminal current of the solar cell and the axis of abscissa represents the terminal voltage of the solar cell. Further, in FIG. 8A, Isc represents an output current value when the terminals of the solar cell are short-circuited while light is irradiated upon the solar cell, and Voc represents an output voltage when the terminals of the solar cell are open while light is irradiated upon the solar cell. The current Isc and the voltage Voc are called short-circuit current and open-circuit voltage, respectively.

As seen in FIG. 8A, when light is irradiated upon the solar cell, the terminal current of the solar cell indicates a maximum value when the terminals of the solar cell are short-circuited. At this time, the terminal voltage of the solar cell is almost 0. On the other hand, when light is irradiated upon the solar cell, the terminal voltage of the solar cell exhibits a maximum value when the terminals of the solar cell are open. At this time, the terminal current of the solar cell is substantially 0 A.

It is assumed now that the graph indicative of a voltage-current characteristic of the solar cell is represented by a curve C1 shown in FIG. 8A. Here, if a load is connected to the solar cell, then the voltage and current to be extracted from the solar cell depend upon the power consumption required by the load connected to the solar cell. A point on the curve C1 represented by a set of the terminal voltage and the terminal current of the solar cell at this time is called operating point of the solar cell. It is to be noted that FIG. 8A schematically indicates the position of the operating point but does not indicate the position of an actual operating point. This similarly applies also to an operating point appearing on any other figure of the present disclosure.

If the operating point is changed on the curve representative of a voltage-current characteristic of the solar cell, then a set of a terminal voltage Va and terminal current Ia with which the product of the terminal voltage and the terminal current, namely, the generated electric power, exhibits a maximum value, is found. The point represented by the set of the terminal voltage Va and the terminal current Ia with which the electric power obtained by the solar cell exhibits a maximum value is called optimum operating point of the solar cell.

When the graph indicative of a voltage-current characteristic of the solar call is represented by the curve C1 illustrated in FIG. 8A, the maximum electric power obtained from the solar cell is determined by the product of the terminal voltage Va and the terminal current Ia which provide the optimum operating point. In other words, when the graph indicating a voltage-current characteristic of the solar cell is represented by the curve C1 illustrated in FIG. 8A, the maximum electric power obtained from the solar cell is represented by the area of a shadowed region in FIG. 8A, namely by Va×Ia. It is to be noted that the amount obtained by dividing Va×Ia by Voc×Isc is a fill factor.

The optimum operating point varies depending upon the electric power required by the load connected to the solar cell, and the point $P_A$ representative of the operating point moves on the curve C1 as the electric power required by the load connected to the solar cell varies. When the electric power amount required by the load is small, the current to be supplied to the load may be lower than the terminal current at the optimum operating point. Therefore, the value of the terminal voltage of the solar cell at this time is higher than the voltage value at the optimum operating point. On the other hand, when the electric power amount required by the load is greater than the electric power amount which can be supplied at the optimum operating point, the electric power amount exceeds the electric power which can be supplied at the illumination intensity at this point of time. Therefore, it is considered that the terminal voltage of the solar cell drops toward 0 V.

Curves C2 and C3 shown in FIG. 8A indicate, for example, voltage-current characteristics of the solar cell when the illumination intensity upon the solar cell varies. For example, the curve C2 shown in FIG. 8A corresponds to the voltage-current characteristic in the case where the illumination intensity upon the solar cell increases, and the curve C3 shown in FIG. 8A corresponds to one voltage-current characteristic in the case where the illumination intensity upon the solar cell decreases.

For example, if the illumination intensity upon the solar cell increases and the curve representative of the voltage-current characteristic of the solar cell changes from the curve C1 to the curve C2, then also the optimum operating point varies in response to the increase of the illumination intensity upon the solar cell. It is to be noted that the optimum operating point at this time moves from a point on the curve C1 to another point on the curve C2.

The MPPT control is nothing but to determine an optimum operating point with respect to a variation of a curve representative of a voltage-current characteristic of the solar cell and control the terminal voltage or terminal current of the solar cell so that electric power obtained from the solar cell may be maximized.

Figure 8B:
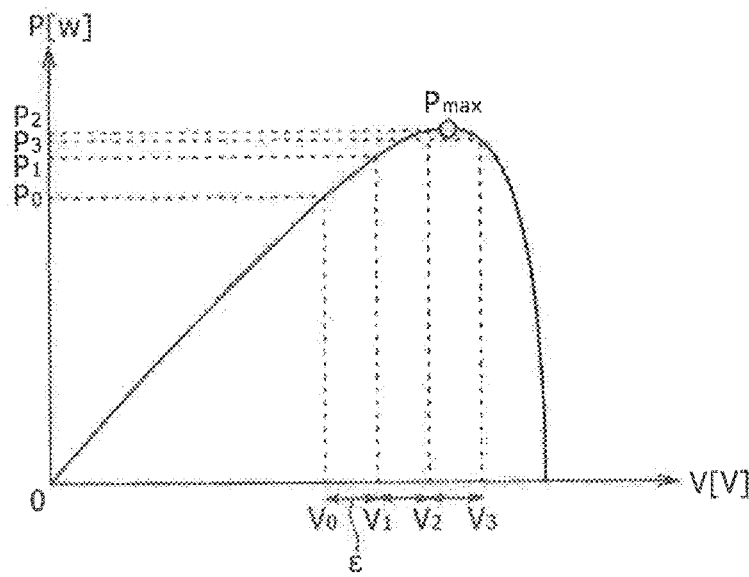
FIG. 8B is a graph, particularly a P-V curve, representative of a relationship between the terminal voltage of the solar cell and the generated electric power of the solar cell in the case where a voltage-current characteristic of the solar cell is represented by a certain curve.

FIG. 8B is a graph, namely, a P-V curve, representative of a relationship between the terminal voltage of the solar cell and the generated electric power of the solar cell in the case where a voltage current characteristic of the solar cell is represented by a certain curve.

If it is assumed that the generated electric power of the solar cell assumes a maximum value Pmax at the terminal voltage at which the maximum operating point is provided as seen in FIG. 8B, then the terminal voltage which provides the maximum operating point can be determined by a method called mountain climbing method. A series of steps described below is usually executed by a CPU or the like of a power conditioner connected between the solar cell and the power system.

For example, the initial value of the voltage inputted from the solar cell is set to $V_0$, and the generated electric power $P_0$ at this time is calculated first. Then, the voltage to be inputted from the solar cell is incremented by $\epsilon$, which is greater than 0, namely, $\epsilon>0$, to determine the voltage $V_1$ as represented by $V_1=V_0+\epsilon$. Then, the generated electric power $P_1$ when the voltage inputted from the solar cell is $V_1$ is calculated. Then, the generated electric powers $P_0$ and $P_1$ are compared with each other, and if $P_1>P_0$, then the voltage to be inputted from the solar cell is incremented by $\epsilon$ as represented by $V_2=V_1+\epsilon$. Then, the generated electric power $P_2$ when the voltage inputted from the solar cell is $V_2$ is calculated. Then, the resulting generated electric power $P_2$ is compared with the formerly generated electric power $P_1$. Then, if $P_2>P_1$, then the voltage to be inputted from the solar cell is incremented by $\epsilon$ as represented by $V_3=V_2+\epsilon$. Then, the generated electric power $P_3$ when the voltage inputted from the solar cell is $V_3$ is calculated.

Here, if $P_3<P_2$, then the terminal voltage which provides the maximum operating point exists between the voltages $V_2$ and $V_3$. By adjusting the magnitude of $\epsilon$ in this manner, the terminal voltage which provides the maximum operating point can be determined with an arbitrary degree of accuracy. A bisection method algorithm may be applied to the procedure described above. It is to be noted that, if the P-V curve has two or more peaks in such a case that a shade appears locally on the light irradiation face of the solar cell, then a simple mountain climbing method cannot cope with this. Therefore, the control program requires some scheme.

According to the MPPT control, since the terminal voltage can be adjusted such that the load as clewed from the solar cell is always in an optimum state, maximum electric power can be extracted from the solar cell in different weather conditions. On the other hand, analog/digital conversion (A/D conversion) is required for calculation of the terminal voltage which provides the maximum operating point and besides multiplication is included in the calculation. Therefore, time is required for the control. Consequently, the MPPT control cannot sometimes respond to a sudden change of the illumination intensity upon the solar cell in such a case that the sty suddenly becomes cloudy and the illumination intensity upon the solar cell changes suddenly.

[Control by the Voltage Tracking Method]

Here, if the curves C1 to C3 shown in FIG. 8A are compared with each other, then the change of the open voltage Voc with respect to the change of the illumination intensity upon the solar cell, which may be considered a change of a curve representative of a voltage-current characteristic, is smaller than the change of the shore-circuit current Isc. Further, all solar cells indicate voltage-current characteristics similar to each other, and it is known that, in the case of a crystal silicon solar cell, the terminal voltage which provides the maximum operating point is found around approximately 80% of the open voltage. Accordingly, it is estimated that, if a suitable voltage value is set as the terminal voltage of the solar cell and the output current of a converter is adjusted so that the terminal voltage of the solar cell becomes equal to the set voltage value, then electric power can be extracted efficiently from the solar cell. Such control by current limitation as just described is called voltage tracking method.

In the following, an outline of the control by the voltage tracking method is described. It is assumed that, as a premise, a switching element is disposed between the solar cell and the power conditioner and a voltage measuring instrument is disposed between the solar cell and the switching element. Also it is assumed that the solar cell is in a state in which light is irradiated thereon.

First, the switching element is switched off, and then when predetermined time elapses, the terminal voltage of the solar cell is measured by the voltage measuring instrument. The reason why the lapse of the predetermined time is waited before measurement of the terminal voltage of the solar cell after the switching off of the switching element is that it is intended to wait that the terminal voltage of the solar cell is stabilized. The terminal voltage at this time is the open voltage Voc.

Then, the voltage value of, for example, 80% of the open voltage Voc obtained by the measurement is calculated as a target voltage value, and the target voltage value is temporarily retained into a memory or the like. Then, the switching element is switched on to start energization of the converter in the power conditioner. At this time, the output current of the converter is adjusted so that the terminal voltage of the solar cell becomes equal to the target voltage value. The sequence of processes described above is executed after every arbitrary interval of time.

The control by the voltage tracking method is high in loss of the electric power obtained by the solar cell in comparison with the MPPT control. However, since the control by the voltage tracking method can he implemented by a simple circuit and is lower in cost, the power conditioner including the converter can be configured at a comparatively low cost.

Figure 9A:
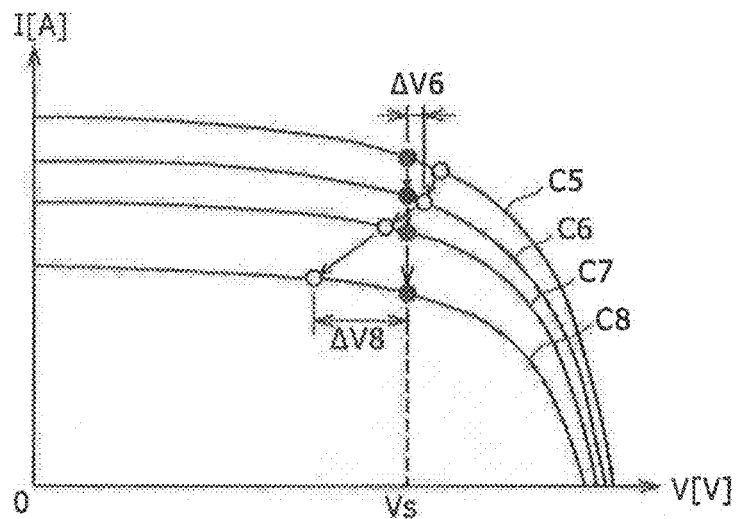
FIG. 9A is a graph illustrating a variation of an operating point with respect to a change of a curve representative of a voltage-current characteristic of a solar cell.

FIG. 9A illustrates a change of the operating point with respect to a change of a curve representative of a voltage-current characteristic of the solar cell. In FIG. 9A, the axis of ordinate represents the terminal current of the solar cell, and the axis of abscissa represents the terminal voltage of the solar cell. Further, a blank round mark in FIG. 9A represents the operating point when, the MPPT control is carried out, and a solid round mark in FIG. 9A represents the operating point when control by the voltage tracking method is carried out.

It is assumed new that the curve representative of a voltage-current characteristic of the solar cell is a curve C5. Then, if it is assumed that, when the illumination intensity upon the solar cell changes, the curve representative or the voltage-current characteristic of the solar cell successively changes from the curve C5 to a curve C8. Also the operating points according to the control methods change in response to the change of the curve representative of the voltage-current characteristic of the solar cell. It is to be noted that, since the change of the open cottage Voc with respect to the change of the illumination intensity upon the solar cell is small, in FIG. 9A, the target voltage value when control by the voltage tracking method is carried out is regarded as a substantially fixed value Vs.

As can be seen from FIG. 8A, when the curve representative of the voltage-current characteristic of the solar cell is a curve C6, the degree of the deviation between the operating point of the MPPT control and the operating point of the control by the voltage tracking method is low. Therefore, it is considered that, when the curve representative of the voltage-current characteristic of the solar cell is the curve C6, there is no significant difference in generated electric power obtained by the solar cell between the two different controls.

On the other hand, if the curve representative of the voltage-current characteristic of the solar cell is the curve C8, then the degree of the deviation between the operating point of the MPPT control and the operating point of the control by the voltage tracking method is high. For example, if the differences $\Delta V6$ and $\Delta V8$ between the terminal voltage when the MPPT control is applied and the terminal voltage when the control by the voltage tracking method is applied, respectively, are compared with each other as seen in FIG. 9A, then $\Delta V6 < \Delta V8$. Therefore, when the curve representative of the voltage-current characteristic of the solar cell is the curve C8, the difference between the generated electric power obtained from the solar cell when the MPPT control is applied and the generated electric power obtained from the solar cell when the control by the voltage tracking method is applied is great.

[Cooperation Control of the Control Unit and the Battery Unit]

Now, an outline of cooperation control of the control unit and the battery unit is described. In the following description, control by cooperation or interlocking of the control unit and the battery unit is suitably referred to as cooperation control.

Figure 9B:
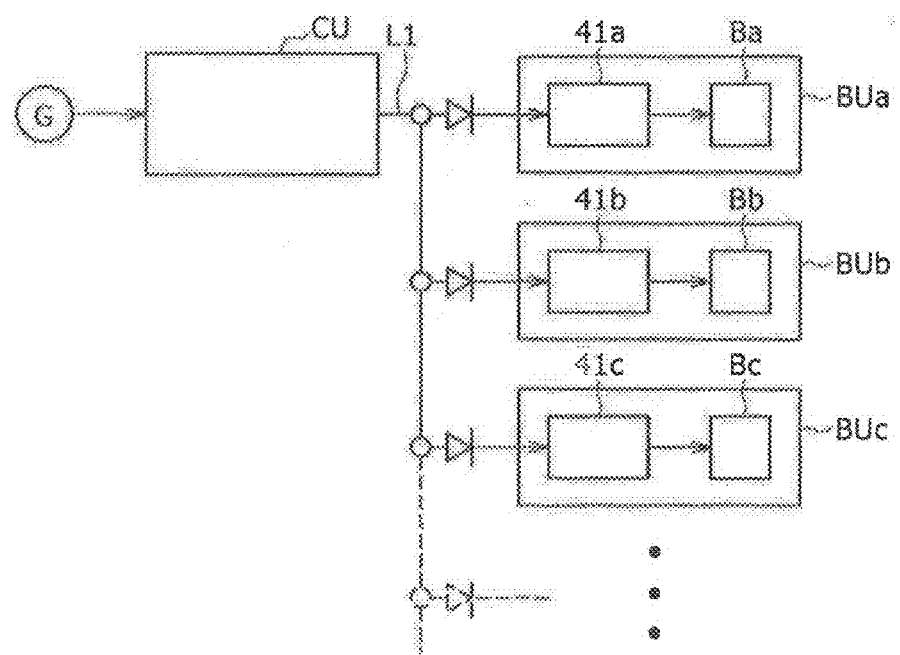
FIG. 9B is a block diagram showing an example of a configuration of a control system wherein cooperation control is carried out by a control unit and a plurality of battery units.

FIG. 9B shows an example of a configuration of a control system wherein cooperation control by a control unit and a plurality of battery units is carried out.

Referring to FIG. 9B, for example, one or a plurality of battery units BU each including a set of a charger circuit and a battery are connected to the control unit CU. The one or plural battery units BU are connected in parallel to the electric power line L1 as shown in FIG. 9B. It is to be noted that, while only one control unit CU is shown in FIG. 9B, also in the case where the control system includes a plurality of control units CU, one or a plurality of control units CU are connected in parallel to the electric power line L1.

Generally, if it is tried to use electric power obtained by a solar cell to charge one battery, then the MPPT control or the control by the voltage tracking method described above is executed by a power conditioner interposed between the solar cell and the battery. Although the one battery may be configured from a plurality of batteries which operate in an integrated manner, usually the batteries are those of the single type. In other words, it is assumed that the MPPT control or the control by the voltage tracking method described above is executed by a single power conditioner connected between a solar cell and one battery. Further, the number and configuration, which is a connection scheme such as parallel connection or series connection, of batteries which make a target of charging do not change but are fixed generally during charging.

In the meantime, in the cooperation control, the control unit CU and the plural battery units BUa, Bub, BUc, . . . carry out autonomous control so that the output voltage of the control unit CU and the voltage required by the battery unite BU are balanced well with each other. As described hereinabove, the batteries B included in the battery units BUa, Bub, BUc, . . . may be of any types. In other words, the control unit CU according to the present disclosure can carry out cooperation control for a plurality of types of batteries B.

Further, in the configuration example shown in FIG. 3B, the individual battery units BU can be connected or disconnected arbitrarily, and also the number of battery units BU connected to the control unit CU is changeable during electric generation of the solar cell. In the configuration example shown in FIG. 9B, the load as viewed from the solar cell is variable during electric generation of the solar cell. However, the cooperation control can cope not only with a variation of the illumination intensity on the solar cell but also with a variation of the load as viewed from the solar cell during electric generation of the solar cell. This is one of significant characteristics which are not achieved by configurations in related arts.

If is possible to construct a control system which dynamically changes the charge rate in response to the supplying capacity from the control unit CU by connecting the control unit CU and the battery units BU described above to each other. In the following, an example of the cooperation control is described. If is to be noted that, although, in the following description, a control system wherein, in an initial state, one battery unit. BUa is connected to the control unit CU is taken as an example, the cooperation control applies similarly also where a plurality of battery units BU are connected to the control unit CU.

It is assumed that, for example, the solar cell is connected to the input side of the control unit CU and the battery unit BUa is connected to the output side of the control unit CU. Also it is assumed that the upper limit to the output voltage of the solar cell is 100 V and the lower limit to the output voltage of the solar cell is desired to be suppressed to 75 V. In other words, it is assumed that the voltage $Vt_0$ is set to $Vt_0=75$ V and the input voltage to the negated input terminal of the operational amplifier 35 is kc×75 V.

Further, it is assumed that the upper limit and the lower limit to the output voltage from the control unit CU are set, for example, to 48 V and 45 V, respectively. In other words, it is assumed that the voltage Vb is set to Vb=45 V and the input voltage to the negated input terminal of the operational amplifier 55 is kb×45 V. It is to be noted that the value of 48 V which is the upper limit to the output terminal from the control unit CU is adjusted by suitably selecting the resistors Rc1 and Rc2 in the high voltage input power supply circuit 11. In other words, it is assumed than the target voltage value of the output from the control unit CU is set to 48 V.

Further, it is assumed that the upper limit and the lower limit to the output voltage from the charger circuit 41a of the battery unit BUa are set, for example, to 42 V and 28 V, respectively. Accordingly, the resistors Rb1, Rb2 and Rb3 in the charger circuit 41a are selected so that the upper limit and the lower limit to the output voltage from the charger circuit 41a may become 42 V and 28 V, respectively.

It is to be noted that a state in which the input voltage to the charger circuit 41a is the upper limit voltage corresponds to a state in which the charge rate into the battery Ba is 100% whereas another state in which the input voltage to the charger circuit 41a is the lower limit voltage corresponds to a state in which the charge rate is 0%. In particular, the state in which the input voltage to the charger circuit 41a is 48 V corresponds to the state in which the charge rate into the battery Ba is 100%, and the state in which the input voltage to the charger circuit 41a is 45 V corresponds to the state in which the charge rate into the battery Ba is 0%. In response to the variation within the range of the input voltage from 45 to 48 V, the charge rate is set within the range of 0 to 100%.

It is to be noted that charge rate control into the battery may be carried out in parallel to and separately from the cooperation control. In particular, since constant current charging is carried out at an initial stage of charging, the output from the charger circuit 41a is feedback-adjusted to adjust the charge voltage so that the charge current may be kept lower than fixed current. Then at a final stage, the charge voltage is kept equal to or lower than a fixed voltage. The charge voltage adjusted here is equal to or lower than the voltage adjusted by the cooperation control described above. By the control, a charging process is carried out within the electric power supplied from the control unit CU.

First, a change of the operating point when the cooperation control is carried out in the case where the illumination intensity upon the solar cell changes is described.

Figure 10A:
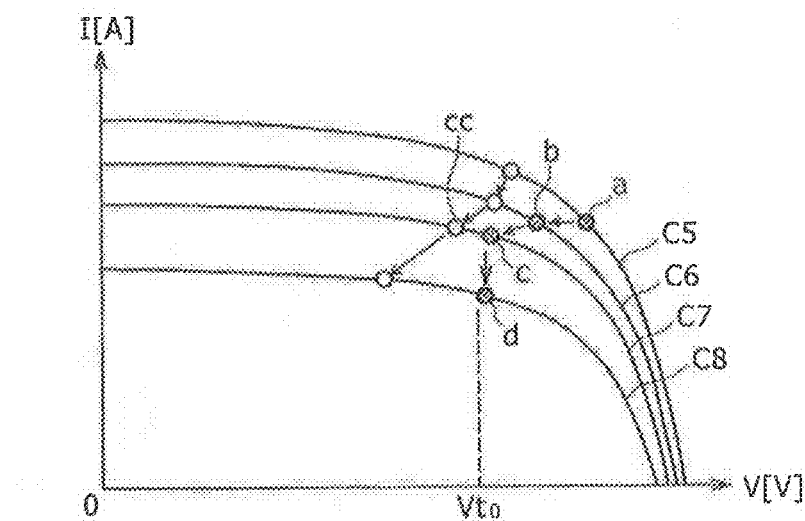
FIG. 10A is a graph illustrating a variation of an operating point when cooperation control is carried out in the case where the illumination intensity upon a solar cell decreases.

FIG. 10A illustrates a change of the operating point when the cooperation control is carried out in the case where the illumination intensity upon the solar cell decreases. In FIG. 10A, the axis of ordinate represents the terminal current of the solar cell and the axis of abscissa represents the terminal voltage of the solar cell. Further, a blank round mark in FIG. 10A represents an operating point when the MPPT control is carried out, and a shadowed round mark in FIG. 10A represents an operating point when the cooperation control, is carried out. Curves C5 to C8 shown in FIG. 10A represent voltage-current characteristics of the solar cell when the illumination intensity upon the solar cell changes.

It is assumed now that the electric power required by the battery Ba is 100 W (watt) and the voltage-current characteristic of the solar cell is represented by the curve C5 which corresponds to the most sunny weather state. Further, it is assumed that the operating point of the solar cell at this time is represented, for example, by a point a on the curve C5, and the electric power or supply amount, supplied from the solar cell to the battery Ba through, the high voltage input, power supply circuit 11 and the charger circuit 41a is higher than the electric power or demanded amount required by the battery Ba.

When the electric power supplied from the solar cell to the battery Ba is higher than the electric power required by the battery Ba, the output voltage from the control unit CU to the battery unit BUa, namely the voltage V12, is 48 V of the upper limit. In particular, since the input voltage to the battery unit. BUa is 48 V of the upper limit, the output voltage from the charger circuit 41a of the battery unit BUa is 42 V of the upper limit, and charge into the battery Ba is carried out at the charge rate of 100%. It is to be noted that surplus electric power is abandoned, for example, as heat. It is to be noted that, although it has been described that the charge into the battery is carried out at 100%, the charge into the battery is not limited to 100% but can be adjusted suitably in accordance with a characteristic of the battery.

If the sky begins to become cloudy from this state, then the curve representative of the voltage-current characteristic of the solar cell changes from the curve C5 to the curve C6. As the sky becomes cloudy, the terminal voltage of the solar cell gradually drops, and also the output voltage from the control unit CU to the battery unit BUa gradually drops. Accordingly, as the curve representative of the voltage-current characteristic of the solar cell changes from the curve C5 to the curve C6, the operating point of the solar cell moves, for example, to a point b on the curve C6.

If the sky becomes cloudier from this state, then the curve representative of the voltage-current characteristic of the solar cell changes from the curve C6 to the curve C7, and as the terminal voltage of the solar cell gradually drops, also the output voltage from the control unit CU to the battery unit BUa drops. When the output voltage from the control unit CU to the battery unit BUa drops by some degree, the control system cannot supply the electric power of 100% to the battery Ba any more.

Here, if the terminal voltage of the solar cell approaches $Vt_0=75$ V of the lower limit from 100 V, then the high voltage input power supply circuit 11 of the control unit CU begins to step down the output voltage to the battery unit BUa from 18 V toward Vb=45 V.

After the output, voltage from the control unit CU to the battery unit BUa begins to drop, the input voltage to the battery unit BUa drops, and consequently, the charger circuit 41a of the battery unit BUa begins to step down the output voltage no the battery Ba. When the output voltage from the charger circuit 41a drops, the charge current supplied to the battery Ba decreases, and the charging into the battery Ba connected to the charger circuit 41a is decelerated. In other words, the charge rare into the battery Ba drops.

As the charge rate to the battery Ba drops, the power consumption decreases, and consequently, one load as viewed from the solar cell decreases. Consequently, the terminal voltage of the solar cell rises or recovers by the decreased amount of the load as viewed from the solar cell.

As the terminal voltage of the solar cell rises, the degree of the drop of the output voltage from the control unit CU to the battery unit BUa decreases and the input voltage to the battery unit BUa rises. As the input voltage to the battery unit BUa rises, the charger circuit 41a of the battery unit BUa steps up the output voltage from the charger circuit 41a to raise the charge rate into the battery Ba.

As the charge rate into the battery Ba rises, the load as viewed from the solar cell increases and the terminal voltage of the solar cell drops by the increased amount of the load as viewed from the solar cell. As the terminal voltage of the solar cell drops, the high voltage input power supply circuit 11 of the control unit CU steps down the output voltage to the battery unit BUa.

Thereafter, the adjustment of the charge rate described above is repeated automatically until the output voltage from the control unit CU to the battery unit BUa converges to a certain value to establish a balance between the demand and the supply of the electric power.

The cooperation control is different from the MPPT control in that it is not controlled by software. Therefore, the cooperation control does not require calculation of the terminal voltage which provides a maximum operating point. Further, the adjustment of the charge rate by the cooperation control does not include calculation by a CPU. Therefore, the cooperation control is low in power consumption in comparison with the MPPT control, and also the charge rate adjustment described above is executed in such a short period of time of approximately several nanoseconds to several hundred nanoseconds.

Further, since the high voltage input power supply circuit 11 and the charger circuit 41a merely detect the magnitude of the input voltage thereto and adjust the output voltage, analog/digital conversion is not required and also communication between the control unit CU and the battery unit BUa is not required. Accordingly, the cooperation control does not require complicated circuitry, and the circuit for implementing the cooperation control is small in scale.

Here, it is assumed that, at the point a on the curve C5, the control unit CU can supply the electric power of 100 W and the output voltage from the control unit CU to the battery unit BUa converges to a certain value. Further, it is assumed that the operating point of the solar cell chances, for example, to the point c on the curve C7. At this time, the electric power supplied to the battery Ba becomes lower than 100 W. However, as seen in FIG. 10A, depending upon selection of the value of the voltage $Vt_0$, electric power which is not inferior to that in the case wherein the MPPT control is carried out can be supplied to the battery Ba.

If the sky becomes further cloudy, then the curve representative of the voltage-current characteristic of the solar cell changes from the curve C7 to the curve C8, and the operating point of the solar cell changes, for example, to a point d on the curve C8.

As seen in FIG. 10A, since, under the cooperation control, the balance between the demand and the supply of electric power is adjusted, the terminal voltage of the solar cell does not become lower than the voltage $Vt_0$. In other words, under the cooperation control, even if the illumination intensity on the solar cell drops extremely, the terminal voltage of the solar cell does not become lower than the voltage $Vt_0$ at all.

If the illumination intensity on the solar cell drops extremely, then the terminal voltage of the solar cell comes to exhibit a value proximate to the voltage $Vt_0$, and the amount of current supplied to the battery Ba becomes very small. Accordingly, when the illumination intensity on the solar cell drops extremely, although time is required for charging of the battery Ba, since the demand and the supply of electric power in the control system are balanced well with each other, the control system does not suffer from the system down.

Since the adjustment of the charge rate by the cooperation control is executed in very short time as described above, according to the cooperation control, even if the shy suddenly begins to become cloudy and the illumination intensity on the solar cell decreases suddenly, the system down of the control system can be avoided.

Now, a change of the operating point when the cooperation control is carried out in the case where the load as viewed from the solar cell changes is described.

Figure 10B:
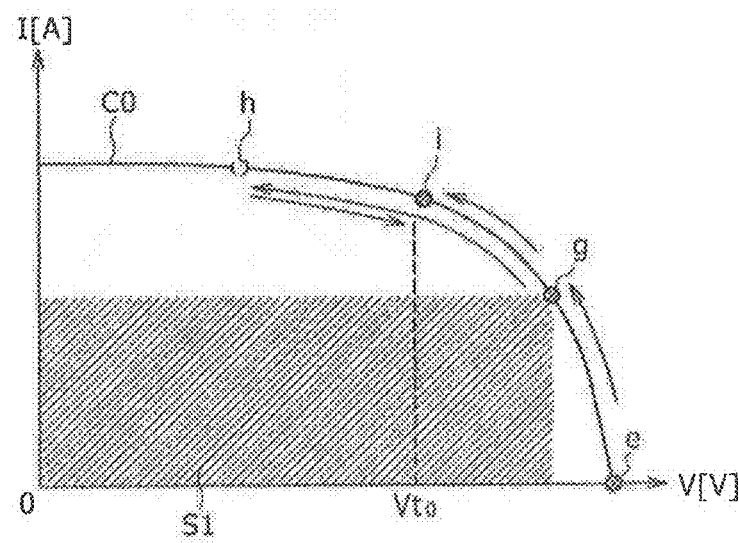
FIG. 10B is a graph illustrating a variation of an operating point when cooperation control is carried out in the case where the load as viewed from the solar cell increases.

FIG. 10B illustrates a change of the operating point when the cooperation control is carried out in the case where the load as viewed from the solar cell increases. In FIG. 10B, the axis of ordinate represents the terminal current of the solar cell and the axis of abscissa represents the terminal voltage of the solar cell. Further, a shadowed round mark an FIG. 10B represents an operating point when the cooperation control is carried out.

It is assumed now that the illumination intensity on the solar cell does not change and the voltage-current characteristic of the solar cell is represented by a curve C0 shown in FIG. 10B.

Immediately after the control system is started up, it estimates that the power consumption in the inside thereof is almost zero, and therefore, the terminal voltage of the solar cell may be considered substantially equal to the open voltage. Accordingly, the operating point of the solar cell immediately after the startup of the control system may be considered existing, for example, at a point e on the curve C0. It is to be noted that the output voltage from the control unit CU to the battery unit BUa may be considered to be 48 V of the upper limit.

After supply of electric power to the battery Be connected to the battery unit BUa is started, the operating point of the solar cell moves, for example, to a point g on the curve C0. It is to be noted that, since, in the description of the present example, the electric power required by the battery Ba is 100 W, the area of a region S1 indicated by a shadow in FIG. 10B is equal to 100 W.

When the operating point of the solar cell is at the point g on the curve C0, the control system is in a stare in which the electric power supplied from the solar cell to the battery Ba through the high voltage input power supply circuit 11 and the charger circuit 41a is higher than the electric power required by the battery Ba. Accordingly, the terminal voltage of the solar cell, the output voltage from the control unit CU and the voltage supplied to the battery Ba when the operating point of the solar cell is at the point g on the curve C0 are 100 V, 48 V and 42 V, respectively.

Here, it is assumed that the battery unit BUb having a configuration similar to that of the battery unit BUa is newly connected to the control unit CU. If it is assumed that the battery Bb connected to the battery unit BUb requires electric power of 100 W for the charge thereof similarly to the battery Ba connected to the battery unit BUa, then the power consumption increases and the load us viewed from the solar cell increases suddenly.

In order to supply totaling electric power of 200 W to the two batteries, the totaling output current must be doubled, for example, while the output voltage from the charger circuit 41a of the battery unit BUa and the charger circuit 41b of the battery unit BUb is maintained.

However, where the power generator is the solar cell, also the terminal voltage of the solar cell drops together with increase of output current from the charger circuits 41a and 41*b*. Therefore, the totaling output current must be higher than twice in comparison with that in the case when the operating point of the solar cell is at the point g. Therefore, the operating point of the solar cell must be, for example, at a point h on the curve C0 as shown in FIG. 10B, and the terminal voltage of the solar cell drops extremely. If the terminal voltage of the solar cell, drops extremely, then the control system may suffer from system down.

In the cooperation control, if the terminal voltage of the solar cell drops as a result of new or additional connection of the battery unit BUb, then adjustment of the balance between the demand and the supply of electric power in the control system is carried out. In particular, the charge rate into the two batteries is lowered automatically so that electric power supplied to the battery Ba and the battery Bb may totally become, for example, 150 W.

In particular, if the terminal voltage of the solar cell drops as a result of new connection of the battery unit BUb, then also the output voltage from the control unit CU to the battery units BUa and BUb drops. If the terminal voltage of the solar cell approaches $Vt_0=75$ V of the lower limit from 100 V, then the high voltage input power supply circuit 11 of the control unit CU begins to step down the output voltage to the battery units BUa and BUb toward Vb=45 V from 48 V.

As the output voltage from the control unit CU to the battery units BUa and BUb is stepped down, the input voltage to the battery units BUa and BUb drops. Consequently, the charger circuit 41*a* of the battery unit BUa and the charger circuit 41*b* of the battery unit BUb begin to step down the output voltage to the batteries Ba and Bb, respectively. As the output voltage from the charger circuit drops, the charging into the batteries connected to the charger circuit is decelerated. In other words, the charge rate to each battery is lowered.

As the charge rate into each battery is lowered, the power consumption decrease as a whole, and consequently, the load as viewed from, the solar cell decreases and the terminal voltage of the solar cell rises or recovers by an amount corresponding to the decreasing amount of the load as viewed from the solar cell.

Thereafter, adjustment of the charge rate is carried out until the output voltage from the control unit CU to the battery units BUa and BUb converges to a certain value to establish a balance between the demand and the supply oil electric power in a similar manner as in the case where the illumination intensity on the solar cell decreases suddenly.

It is to be noted that it depends upon the situation to which value the voltage value actually converges. Therefore, although the value to which the voltage value actually converges is not known clearly, since charging stops when the terminal voltage of the solar cell becomes equal to $Vt_0=75$ V of the lower limit, it is estimated that the voltage value converges to a value a little higher then the value of $Vt_0$ of the lower limit. Further, it is estimated that, since the individual battery units are not controlled in an interlocking relationship with each other, even if the individual battery units have the same configuration, the charge rate differs among the individual battery units due to a dispersion of used elements, however, there is no change in that the battery units can generally be controlled by the cooperation control.

Since the adjustment of the charge rate by the cooperation control is executed in a very short period of time, if the battery unit BUb is connected newly, then the operating point of the solar cell changes from the point g to a point i on the curve C0. It is to be noted that, while a point h is illustrated as an example of the operating point of the solar cell on the curve C0 for the convenience of description in FIG. 10B, under the cooperation control, the operating point of the solar cell does not actually change to the point h.

In this manner, in the cooperation control, the charger circuit of the individual battery units BU detects the magnitude of the input voltage thereto in response to an increase of the load as viewed from the solar cell, and automatically suppresses the current amount to be sucked thereby. According to the cooperation control, even if the number of those battery units BU which are connected to the control unit CU increases to suddenly increase the load as viewed from the solar cell, otherwise possible system down of the control system can be prevented.

Now, a change of the operating point when the cooperation control is carried out in the case where both of the illumination intensity on the solar cell end the load as viewed from the solar cell vary is described.

Figure 11A:
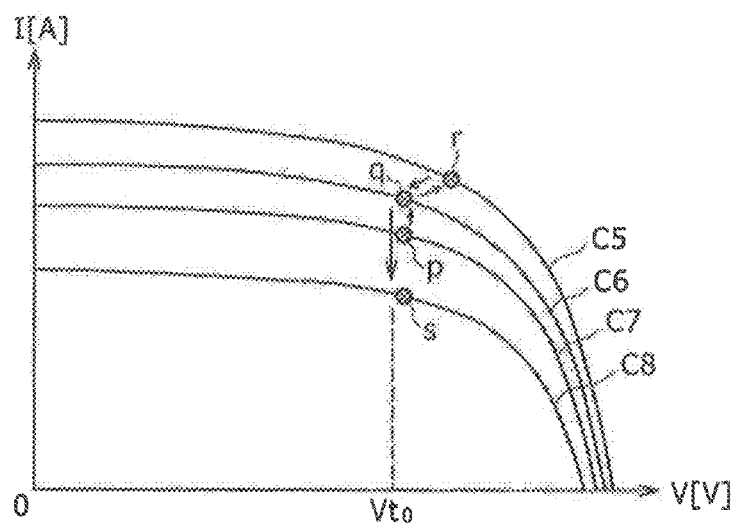
FIG. 11A is a graph illustrating a variation of an operating point when cooperation control is carried out in the case where both of the illumination intensity upon the solar cell and the load as viewed from the solar cell vary.

FIG. 11A illustrates a change of the operating point when the cooperation control is carried out in the case where both of the illumination intensity on the solar cell and the load as viewed from the solar cell vary. In FIG. 11A, the axis of ordinate represents the terminal current of the solar cell and the axis of abscissa represents the terminal voltage of the solar cell. A shadowed round mark in FIG. 11A represents an operating point when the cooperation control is carried out. Curves C5 to C8 shown in FIG. 11A indicate voltage-current characteristics of the solar cell in the case where the illumination intensify upon the solar cell varies. In the following, those curves which represent voltage-current characteristics of the solar cell corresponding to the same illumination intensity are denoted by a like reference character in the drawings.

First, it is assumed that the battery unit BUa which includes the battery Ba which requires the electric power of 100 W for the charging thereof is connected to the control unit CU. Also it is assumed that the voltage-current characteristic of the solar cell at this time is represented by a curve C7 and the operating point of the solar cell is represented by a point p on the curve C7.

It is assumed that the terminal voltage of the solar cell at the point p considerably approaches the voltage $Vt_0$ set in advance as a lower limit to the output voltage of the solar cell. That the terminal voltage of the solar cell considerably approaches the voltage $Vt_0$ signifies that, in the control system, adjustment of the charge rate by the cooperation control is executed and the charge rate is suppressed significantly. In particular, in the state in which the operating point of the solar cell is represented by the point p shown in FIG. 11A, the electric power supplied to the battery Ba through the charger circuit 41*a* is considerably higher than the electric power supplied to the high voltage input power supply circuit 11 from the solar cell. Accordingly, in the state in which the operating point of the solar cell is represented by the point p shown in FIG. 11A, adjustment of the charge rate is carried out by a great amount, and electric power considerably lower than 100 W is supplied to the charger circuit 41*a* which charges the battery Ba.

It is assumed that the illumination intensity upon the solar cell thereafter increases and the curve representative of the voltage-current characteristic of the solar cell changes from the curve C7 to the curve C6. Further, it is assumed that the battery unit BUb which, has a configuration similar to that of the battery unit BUa is newly connected to the control unit CU. At this time, the operating point of the solar cell changes, for example, from the point p on the curve C7 to a point q on the curve C6.

Since the two battery units are connected to the control unit CU, the power consumption when the charger circuits 41*a* and 41b fully charge the batteries Ba and Bb is 200 W. However, when the illumination intensity upon the solar cell is not sufficient, the cooperation control is continued and the power consumption is adjusted to a value lower than 200 W such as, for example, to 150 W.

It is assumed here that the sky thereafter clears up and the curve representative of the voltage-current characteristic of the solar cell changes from the curve C6 to the curve C5. At this time, when the generated electric power of the solar cell increases together with the increase of the illumination intensity upon the solar cell, the output current from the solar cell increases.

If the illumination intensity upon the solar cell increases sufficiently and the generated electric power of the solar cell further increases, then the terminal voltage of the solar cell becomes sufficiently higher than the voltage $Vt_0$ at a certain point. If the electric power supplied from the solar cell to the two batteries through the high voltage input power supply circuit 11 and the charger circuits 41a and 41b comes to be higher than the electric power required to charge the two batteries, then the adjustment of the charge rata by the cooperation control is moderated or automatically cancelled.

At this time, the operating point of the solar cell, is represented, for example, by a point r on the curve C5 and charging into the individual batteries Ba and Bb is carried out at the charge rate of 100%.

Then, it is assumed that the illumination intensity upon the solar cell decreases and the curve representative of the voltage-current characteristic of the solar cell changes from the curve C5 to the curve C6.

When the terminal voltage of the solar cell drops and approaches the voltage $Vt_0$ set in advance, the adjustment of the charge rate by the cooperation control is executed again. The operating point of the solar cell at this point of time is represented by a point q of the curve C6.

It is assumed that the illumination intensity on the solar cell thereafter decreases further arid the curve representative of the voltage-current characteristic of the solar cell changes from, the curve C6 to the curve C8.

Consequently, since the charge rate is adjusted so that the operating point of the solar cell may not become lower than the voltage $Vt_0$, the terminal current from the solar cell decreases, and the operating point of the solar cell changes from the point q on the curve C6 to a point s on the curve C8.

In the cooperation control, the balance between the demand and the supply of electric power between the control unit CU and the individual battery units BU is adjusted so that the input voltage to the individual battery units BU may not become lower than the voltage $Vt_0$ determined in advance. Accordingly, with the cooperation control, the charge rate into the individual batteries B can be changed on the real time basis in response to the supplying capacity of the input side as viewed from the individual battery units BU. In this manner, the cooperation control can cope not only with a variation of the illumination intensity on the solar cell but also with a variation of the load as viewed from the solar cell.

As described, hereinabove, the present disclosure does not require a commercial power supply. Accordingly, the present disclosure is effective also in a district in which a power supply apparatus or electrical power network is not maintained.

Figure 11B:
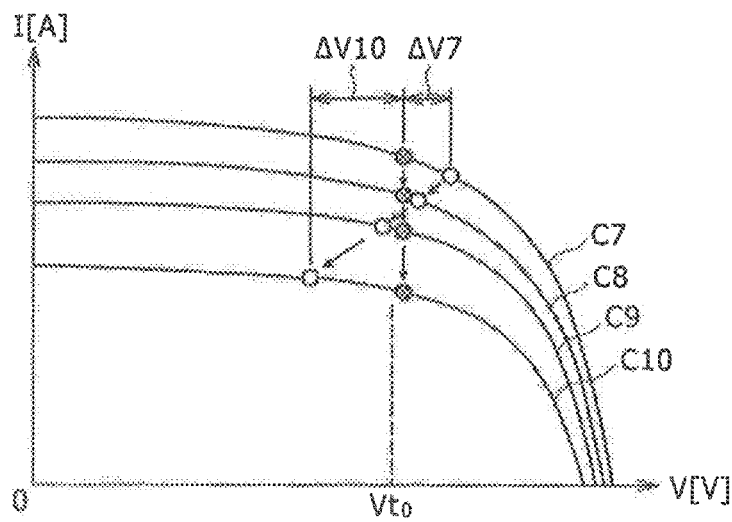
FIG. 11B is a graph illustrating an operating point when MPPT control is executed and an operating point when adjustment of the charge rate by cooperation control is executed for comparison therebetween.

FIG. 11B illustrates the operating point when the MPPT control is executed and the operating point when adjustment of the charge rate by the cooperation control is executed for comparison therebetween. In FIG. 11B, the axis of ordinate represents the terminal current of the solar cell and the axis of abscissa represents the terminal voltage of the solar cell. Further, a blank round mark in FIG. 11B represents an operating point when the MPPT control is carried out and a shadowed round mark in FIG. 11B represents an operating point when the cooperation control, is carried out. Curves C7 to C10 shown in FIG. 11B represent voltage-current characteristics of the solar cell in the case where the illumination intensity upon the solar cell varies.

It is assumed here that, where the voltage-current characteristic of the solar cell is represented by each of the curves C7 to C10, adjustment of the charge rate by the cooperation control is executed. Further, connection or disconnection of a battery unit BU to or from the control unit CU does not occur and there is no variation in load as viewed from the solar cell. This applies also to the following description.

When adjustment of the charge rate by the cooperation control is executed by the control system, the terminal voltage of the solar cell assumes a voltage proximate to the voltage $Vt_0$ set in advance as seen in FIG. 11B.

If it is assumed here that the curve representative of the voltage-current characteristic of the solar cell is represented by the curve C8 or the curve C9 shown in FIG. 11B, then the degree of the deviation between the operating point in the cooperation control and the operating point in the MPPT control is small as seen in FIG. 11B. Accordingly, in such a case that the curve representative of the voltage-current characteristic of the solar cell is represented by the curve C8 or C9, a significant difference does not appear in generated electric cover obtained from the solar cell in any of the cooperation control and the MPPT control.

On the other hand, if the curve representative of the voltage-current characteristic of the solar cell is the curve C7, then the degree $\Delta V7$ of the deviation between the operating point in the cooperation control and the operating point in the MPPT control is great as seen from FIG. 11B. In the case where the curve representative of the voltage-current characteristic of the solar cell is the curve C10, the degree $\Delta V10$ of the deviation between the operating point in the cooperation control and the operating point in the MPPT control is greater than that in the case of the degree $\Delta V7$ of the deviation.

Accordingly, in such a case that the curve representative of the voltage-current characteristic of the solar cell is the curve C7 or the curve C10, the difference between the generated electric power obtained from the solar cell by applying the cooperation control and the generated electric power obtained from the solar cell by applying the MPPT control is great.

This signifies that, in the case where the degree of the deviation between the operating point in the cooperation control and the operating point in the MPPT control is great and the illumination intensity upon the solar cell little varies, the loss of electric power obtained by the solar cell is accumulated as time passes.

The inventors of the present disclosure took notice of the degree of the deviation between the operating point in the cooperation control and the operating point in the MPPT control and intensively studied in order to suppress the loss of the electric power obtained from a solar cell. As a result, the technology of the present disclosure has been invented successfully.

[Suppression of the Electric Power Loss]

Figure 12A:
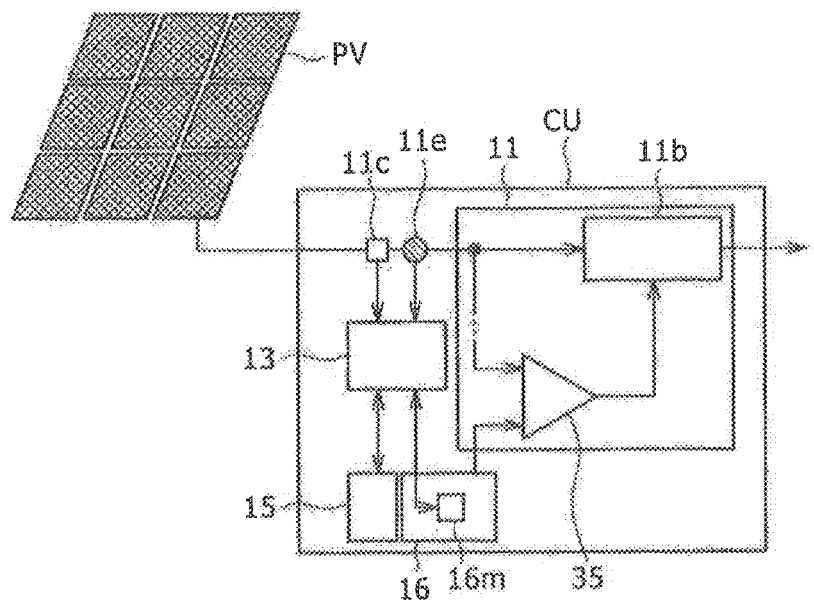
FIG. 12A is a block diagram showing an example of a configuration of a power controlling apparatus according to an embodiment of the present disclosure.

FIG. 12A snows an example of a configuration of the power controlling apparatus according to the present disclosure. As seen in FIG. 12A, the power controlling apparatus according to the present disclosure can be configured, for example, from the control unit CU described hereinabove. While, in FIG. 12A, a control unit which includes the high voltage input power supply circuit 11 is shown as an example of the power controlling apparatus, the control unit may otherwise include the low voltage input power supply circuit 12 in place of or in addition to the high voltage input power supply circuit 11.

Referring to FIG. 12A, the control unit CU includes a high voltage input power supply circuit 11, a voltage sensor 11c, a current sensor 11e, a CPU 13, a memory 15 in which a control program is stored, and a D/A conversion section 16. The high voltage input power supply circuit 11 includes a DC-DC converter 11b and an operational amplifier 35. The D/A conversion section 16 includes a built-in memory 16m.

As described hereinabove, a value of the voltage $Vt_0$ is retained in the built-in memory 16m of the D/A conversion section 16, and the D/A conversion section 16 converts a digital value retained in the built-in memory 16m and outputs a corresponding voltage. The digital value retained in the built-in memory 16m is rewritten, for example, by the CPU 13 when necessary. The CPU 13 may extract the data from the memory 15 and set, every time the control unit CU is started up, the digital value retained in the built-in memory 16m.

As described hereinabove, an electric power generation section for generating electric power in response to the environment is connected to the control unit CU. In FIG. 12A, a configuration example is shown wherein a solar cell PV is connected as the electric power generation section to the control unit CU. Electric power obtained from the electric power generation section is supplied to a load such as one or a plurality of batteries B through the control unit CU.

The magnitude of the electric power obtained from the electric power generation section varies depending upon the environmental situation. The control unit CU varies the output voltage therefrom in response to the variation of the voltage sent out thereto from the electric power generation section.

As seen in FIG. 12A, a voltage equal to kc times the input voltage to the high voltage input power supply circuit 11 provided in the control unit CU is applied to the non-negated input terminal of the operational amplifier 35.

Meanwhile, to the negated input terminal of the operational amplifier 35, a voltage of a magnitude equal to kc times a value Et of the voltage set in advance as a lower limit to the output voltage of the solar cell is applied from the D/A conversion section 16.

As described hereinabove, the value Et or the reference voltage is retained, for example, in the memory 16m built in the D/A conversion section 16. Accordingly, when, for example, the lower limit to the output voltage of the solar cell is set to $Vt_0$, the value Et of the voltage is set to $Et=Vt_0$. Accordingly, a voltage of the magnitude of $kc \times Vt_0$ is applied to the negated input terminal of the operational amplifier 35. In the following description, the voltage set in advance as the lower limit to the output voltage of the solar cell is suitably referred to as reference voltage.

An output from the output terminal of the operational amplifier 35 is inputted to the controlling terminal provided, for example, on the driver of the DC-DC converter 11b as described hereinabove. The DC-DC converter 11b adjusts the output voltage from the high voltage input power supply circuit 11 so that the input voltage to the controlling terminal may be fixed. Accordingly, the output voltage from the control unit CU is adjusted in response to a variation of the voltage from the electric power generation section.

It is to be noted that the CPU 13 acquires a magnitude of the input voltage to the control unit CU by the voltage sensor 11c. The magnitude of the input voltage to the control unit CU is the magnitude of the terminal voltage of the solar cell PV.

Further, the CPU 13 acquires the magnitude of the input current to the control unit CU by the current sensor 11e. The magnitude of the input current to the control unit CU is the magnitude of the terminal current of the solar cell PV.

Figure 12B:
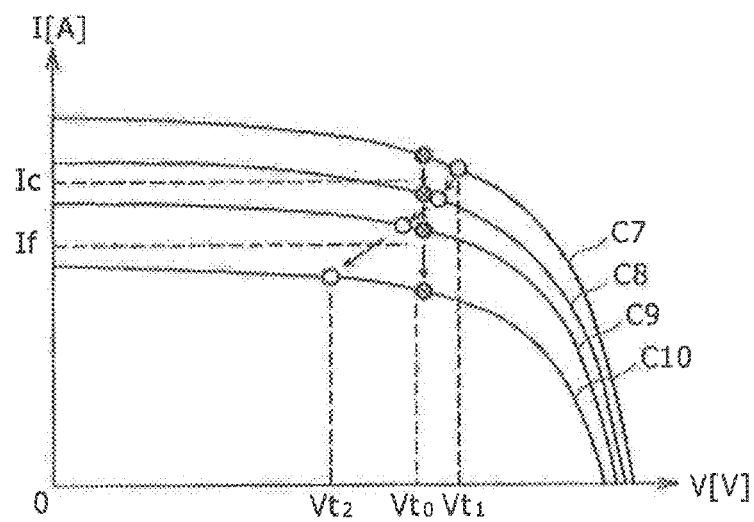
FIG. 12B is a graph illustrating a determination method regarding whether or not adjustment of the charge rate by cooperation control is being executed.

FIG. 12B illustrates an example of a decision method of whether or not adjustment of the charge rate by the cooperation control is being executed. In FIG. 12B, the axis of ordinate represents the terminal current of the solar cell and the axis of abscissa represents the terminal voltage of the solar cell. Further, a blank round mark in FIG. 12B represents an operating point when the MPPT control is carried out and a shadowed round mark in FIG. 12B represents an operating point when the cooperation control is carried out. Carves C7 to C10 shown in FIG. 12E represent voltage-current characteristics of the solar cell in the case where the illumination intensity upon the solar cell varies.

When the terminal voltage of the solar cell approaches the reference voltage together with a drop of the illumination intensity upon the solar cell, the high voltage input power supply circuit 11 steps down the output voltage therefrom as described hereinabove. It is to be noted that, under the cooperation control, since the balance between the demand and the supply of electric power is adjusted, the terminal voltage of the solar cell does not become lower than the voltage $Vt_0$.

Accordingly, if $\delta$ of a suitable magnitude greater than 0 is assumed, then when the terminal voltage of the solar cell is higher than the voltage $Vt_0$ but it equal to or lower than $Vt_0+\delta$, it can be decided that adjustment of the charge rate by the cooperation control is being executed. The value of $\delta$ can be set suitably and is, for example, approximately several to several tens V or less.

Here, if the group of operating points when the cooperation control in FIG. 12B is carried out is referred to, then all operating points are proximate to the reference voltage $Vt_0$. Accordingly, it can be decided that a state represented by an operating point when the cooperation control in FIG. 12B is carried out is a state in which adjustment of the charge rate by the cooperation control is being executed.

In this manner, with the cooperation control, if the terminal voltage of the solar cell is measured, then a relationship in magnitude between the demand and the supply of electric power at a certain point of time can be estimated.

For example, if the terminal voltage of the solar cell is sufficiently higher than $Vt_0+\delta$, then it can be decided that the supplying capacity of electric power is sufficiently high with respect to the demand for electric power. In contrast, for example, with the MPPT control, it is difficult to decide whether or not the supplying capacity is sufficiently high with respect to the demand for electric power.

When the MPPT control is applied, if the operating point at present is or the higher voltage side than the optimum operating point, then it can be decided that surplus electric power is available. However, in this instance, it is necessary to determine the electric power amount at the optimum operating point and the generated electric power amount at present and obtain the difference between them. However, since measurement of the current or the voltage involves some error, it is difficult to determine an accurate value of the generated electric power amount. In contrast, according to the present disclosure, since such electric power calculation is not necessary, the decision of whether or not a surplus supplying capacity is available can be made by simple and easy calculation.

The number of curves representative of the voltage-current characteristic of the solar cell is very great depending upon the illumination intensity on the solar cell. However, according to the cooperation control, by measuring the terminal current together with the terminal voltage of the solar cell, it is possible to estimate a curve representative of a voltage-current characteristic upon measurement of the terminal voltage.

In particular, if graphs of curves representative of the voltage-current characteristic of the solar cell are grasped in advance, then by measuring the terminal current together with the terminal voltage of the solar cell, a curve representative of a voltage-current characteristic upon measurement of the terminal voltage can be estimated.

For example, it is assumed that, when the terminal voltage of the solar cell is measured, the resulting measurement value is equal to or lower than $Vt_0+\delta$. A curve which passes near an operating point represented by a set of the obtained terminal voltage and terminal current at this time is a curve representative of the voltage-current characteristic or the solar cell upon measurement of the terminal voltage. It is to be noted that a graph of a curve representative of the voltage-current characteristic of the solar cell can be grasped in advance by grasping a characteristic of the solar cell PV connected to one control unit CU in advance.

For example, in the case where the MPPT control is applied, in order to estimate a curve representative of a voltage-current characteristic upon measurement of the terminal voltage, it is necessary to record sots of the terminal voltage and the terminal current. Meanwhile, according to the present disclosure, after the terminal voltage is measured, only it is necessary to record a value of the terminal current. Consequently, the required memory capacity can be reduced in comparison with an alternative case in which the MPPT control is applied. Especially, in the case where the measurement value of the terminal voltage exceeds $Vt_0+\delta$, also the measurement of the terminal current can be made unnecessary. Further, as hereinafter described, according to the present disclosure, when a curve representative of a voltage-current characteristic is estimated upon measurement of the terminal voltage, it is sufficient if only the measurement value of the terminal current and a threshold value are retained.

Furthermore, in the case where adjustment of the charge rate by the cooperation control is being executed, the degree of the deviation between the operating point in the cooperation control and the operating point in the MPPT control can be estimated.

For example, it is assumed that, by measurement of a characteristic of the solar cell PV connected to the control unit CU in advance, the four curves C7 to C10 shown in FIG. 12B are obtained in advance as graphs of the curve representative of the voltage-current characteristic of the solar cell. Further, it is assumed that the operating point in the MPPT control is grasped in advance and a plurality of threshold values different from each other are set for the measurement value of the terminal current. For example, in the example illustrated in FIG. 12B, two threshold values If and Ic are set. Here, it is assumed that If<Ic.

It is assumed that, as seen in FIG. 12B, the threshold value Ic exists, for example, between a value of the terminal current corresponding to the voltage $Vt_0$ on the curve C7 and a value of the terminal current corresponding to the terminal voltage $Vt_0$ on the curve C8. Further, it is assumed that, the threshold value If is set, for example, between a value of the terminal current corresponding to the terminal voltage $Vt_0$ on the curve C10 and a value of the terminal current corresponding to the terminal voltage $Vt_0$ on the curve C9.

It is assumed that, when the terminal voltage and the terminal current of the solar cell are measured, for example, the measurement value of the terminal voltage is equal to or lower than $Vt_0+\delta$ and besides the measurement value of the terminal current is higher than Ic.

That the measurement value of the terminal voltage is equal to or lower than $Vt_0+\delta$ signifies that adjustment of the charge rate by the cooperation control is being executed upon measurement of the terminal voltage. Further, that the measurement value of the terminal current is higher than Ic signifies that the operating point is not on any of the curves C8 to C10 and besides also the degree of tee deviation between the operating point in the cooperation control and the operating point in the MPPT control is high.

If it is assumed that the operating point at this point of time exists on the curve C7 and variation of the illumination intensity on the solar cell does not occur for a while, then when the MPPT control is executed, the loss of electric power obtained by the solar cell can be suppressed rather than when the cooperation control is executed. In other words, if it is assumed that a variation of the illumination intensity on the solar cell does not occur for a while, then if the value of the reference voltage is raised temporarily and the lower limit to the output voltage of the solar cell is set to a voltage higher than the voltage $Vt_0$, then the accumulation of the loss of the electric power obtained by the solar cell can be reduced.

Similarly, if it is assumed that the measurement value of the terminal voltage is equal to or lower than $Vt_0+\delta$ and besides the measurement value of the terminal current is lower than If, then if the value of the reference value is lowered temporarily, then the accumulation of the loss of the electric power obtained by the solar cell can be reduced.

Therefore, in the present disclosure, when the cooperation control is executed, the value of the reference voltage is not fixed, but when a fixed condition is satisfied, the value of the reference voltage is changed flexibly. Generally, in the case where adjustment of the charge rate by the cooperation control is being executed, when the state in which the degree of the deviation between the operating point in the cooperation control and the operating point in the MPPT control is high continues for a period longer than a period of time set in advance, adjustment of the value of the reference voltage is carried out.

A period of time can be set arbitrarily such that, when the state in which the degree of the deviation between the operating point in the cooperation control and the operating point in the MPPT control is high continues for more than the set period of time, adjustment of the value of the reference voltage is to be carried out. For example, the period of time to be used as a reference for the determination of whether or not adjustment of the value of the reference voltage is to be executed can be set suitably, for example, from visual observation, weather information, a measurement value by an illumination intensity meter and so forth. If the electric power obtained from the solar cell exhibits an intense variation with respect to the period of time as a reference for determination regarding whether or not adjustment of the value of the reference voltage should be executed, then the value of the reference voltage is returned, for example, to a value set as an initial value.

In the following, an example of particular control of the present disclosure is described with reference to FIGS. 13 to 16. The series of processes described below is executed, for example, by the CPU 13 in the control unit CU.

FIGS. 13 to 16 are flow charts illustrating an example of the control of the present disclosure.

Figure 13:
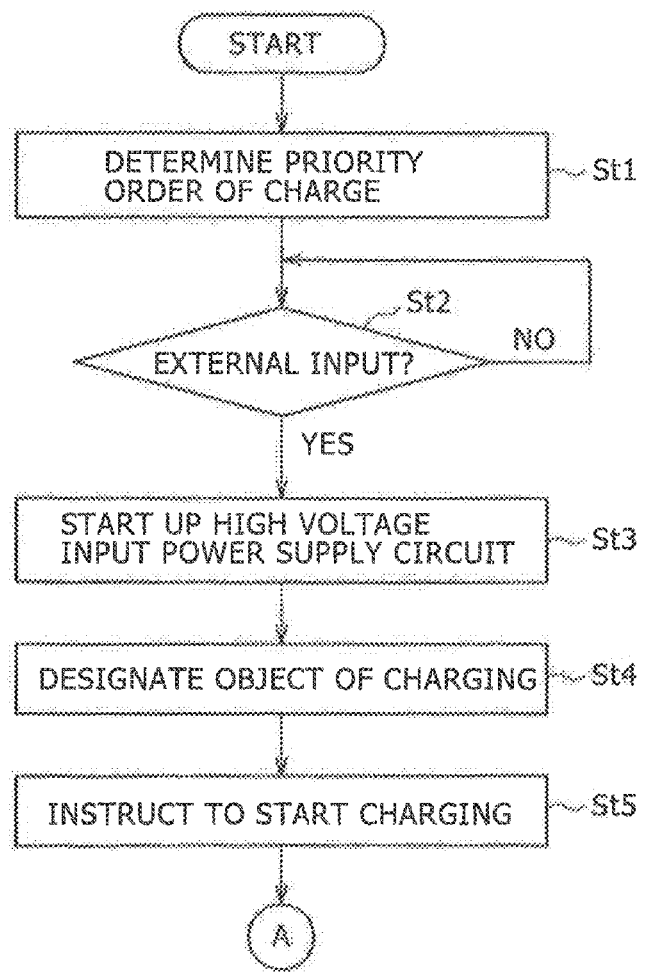
FIGS. 13 to 16 are flow charts illustrating an example of control according to an embodiment of the present disclosure.

Referring first to FIG. 13, a priority order in which the batteries B are to be charged, successively is determined. This is because, in the case where a plurality of battery units BU are connected to the control unit CU, it is possible it the control system 1 to control the battery units BU independently of each other as described hereinabove. The priority order in which the batteries B are to be charged successively is determined, for example, based on the remaining capacities of the batteries B.

Then at step St2, it is decided whether or not electric power is supplied to the control unit CU. The CPU 13 acquires the magnitude of the input voltage to the control unit CU by the voltage sensor 11c. If the magnitude of the input voltage to the control unit CU does not exceed a threshold value set in advance, then the CPU 13 decides that no electric power is generated by the electric power generation section. This similarly applies also to a case in which no electric power generation section is connected to the control unit CU.

However, if the magnitude of the input voltage to the control unit CU exceeds the threshold value set in advance, then the high voltage input power supply circuit 11 is started up at step St3.

Then at step St4, the control unit CU designates a battery B as a target of charge based on the priority order determined at step St1.

Then at step St5, the control unit CU instructs the battery unit BU, which includes the battery B of the target of charge, to start charging. In particular, the control unit CU signals a command to the CPU 15 of the battery unit BU which includes the battery B of the target of charge.

The CPU 45 switches on the switch SW7 shown in FIG. 6 based on the acquired command. An this time, the switches SW6 and SW8 remain off. As a result of switching on of the switch SW7, the control unit CU and the battery unit BU are electrically connected to each other.

Then at step it a shown in FIG. 14, the value Et of the reference voltage to be stored into the memory 15 is set, for example, to $Vt_0$ as an initial value. The magnitude of the initial value $Vt_0$ can be set suitably, for example, in response to an installed place of the solar cell PV, a long-term weather and so forth.

Further, at step St6, a counter n which assumes an integral value is reset.

Then at step St7, it is decided whether or not an instruction to end the charge into the battery B is received. If an instruction to end the charge into all battery units BU is received, then the processing is ended here.

If it is decided at step St7 that an instruction to end the charge into the battery B is not received, then it is decided at step St8 whether or not adjustment of the charge rate by the cooperation control is being executed. In other words, it is decided whether or not the measurement value V of the terminal voltage is equal to or lower than $Vt_0+\delta$. If adjustment of the charge rate by the cooperation control is not being executed, then since the electric power supplying capacity is sufficiently greater than the demand for electric power, the processing is returned to step St7. On the other hand, if adjustment of the charge rate by the cooperation control is being executed, then the processing advances to step St9. It is to be noted that the time for the transition from step St7 to step St8 may be set arbitrarily.

Then at step St9, it is estimated on which one of curves representative of voltage-current characteristics of the solar cell the operating point is at the time of measurement of the terminal voltage. More particularly, measurement of the terminal current of the solar cell is carried out together with measurement of the terminal voltage of the solar cell, and it is decided to which one of a plurality of set sections the measurement value I of the terminal current belongs.

For example, it is assumed first that a plurality of threshold values different from each other are set for the measurement value of the terminal current. The certainty of the estimation enhances as the number of set threshold values increases, or in other words, as the sections set for the measurement value I of the terminal current are made finer. However, in order to simplify the description, it is assumed that two threshold values If and Ic are set as illustrated in FIG. 12B.

If the measurement value I of the terminal current satisfies, for example, If≤I≤Ic, then the value of a flag bk is set to 0 at step St10.

For example, if it is assumed that the curves C7 to C10 shown in FIG. 12B are obtained in advance as graphs of a curve representative of the voltage-current characteristic of the solar cell, then it can be decided that, the operating point at the point of time of measurement of the terminal voltage does not exist on the curve C7 nor on the curve C10. In other words, since the decree of the deviation between the operating point of the MPPT control and the operating point of the control by the voltage tracking method is low, the initial value $Vt_0$ as the value Et of the reference voltage at this point of time is considered appropriate.

If the measurement value I of the terminal current satisfies, for example, Ic<I, then the value of the flag bk is set to 1 at step St11, but if the measurement value I of the terminal current satisfies I<If, then the value of the flag bk is set to 2 at step St12.

Figure 15:
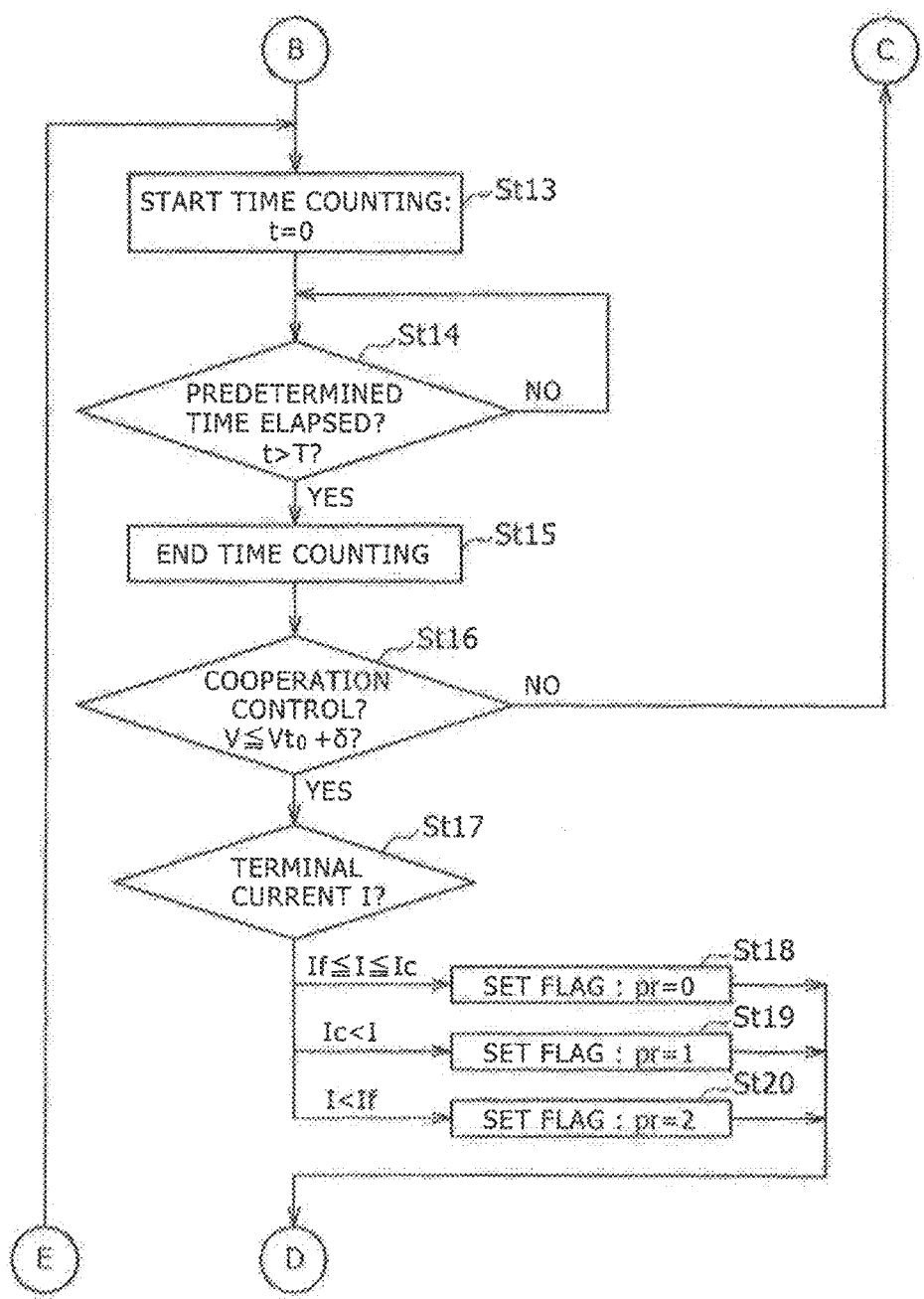

Then at step St13 illustrated in FIG. 15, timing, for example, by a timer is started.

Then at step St14, it is decided whether or not time T set in advance elapses after the start of timing by the timer or the like. In particular, it is decided whether or not time t obtained by the timing by the timer or the like satisfies a relationship of t>T. A period of measurement of the terminal voltage is defined by the time T set in advance. In other words, every time the time T elapses, the decision of whether or not adjustment of the charge rate by the cooperation control is being executed is executed.

If the time T set in advance elapses, then the processing advances to step St15, at which the timing is ended.

Then at step St16, it is decided by a method similar to that at step St8 whether or not adjustment of the charge rate by the cooperation control is being executed.

If adjustment of the charge rate by the cooperation control is not being executed, then since the electric power supplying capacity is sufficiently higher than the demand for electric power, the processing returns to step St6. Then at step St6, the counter n is reset and the value Et of the reference voltage is set to the initial value $Vt_0$.

On the other hand, if adjustment of the charge rate by the cooperation control is being executed at step St16, then the processing advances to step St17.

At step St17, it is estimated on which one of the curves representative of voltage-current characteristics of the solar cell the operating point is at the time of measurement of the terminal voltage by a method similar to that at step St9.

If the measurement value I of the terminal, current satisfies, for example, If≤I≤Ic, then the value of a flag or is set to 0 at step St18. If the measurement value I of the terminal current satisfies, for example, Ic<I, then the value of the flag pr is set to 1 at step St19. However, if the measurement value I of the terminal current satisfies I<If, then the value of the flag pr is set to 2 at step St20. The value of the flag pr indicates to which one of the curves C7, C8 (C9) and C10 the operating point at the present point of time is near.

Figure 16:
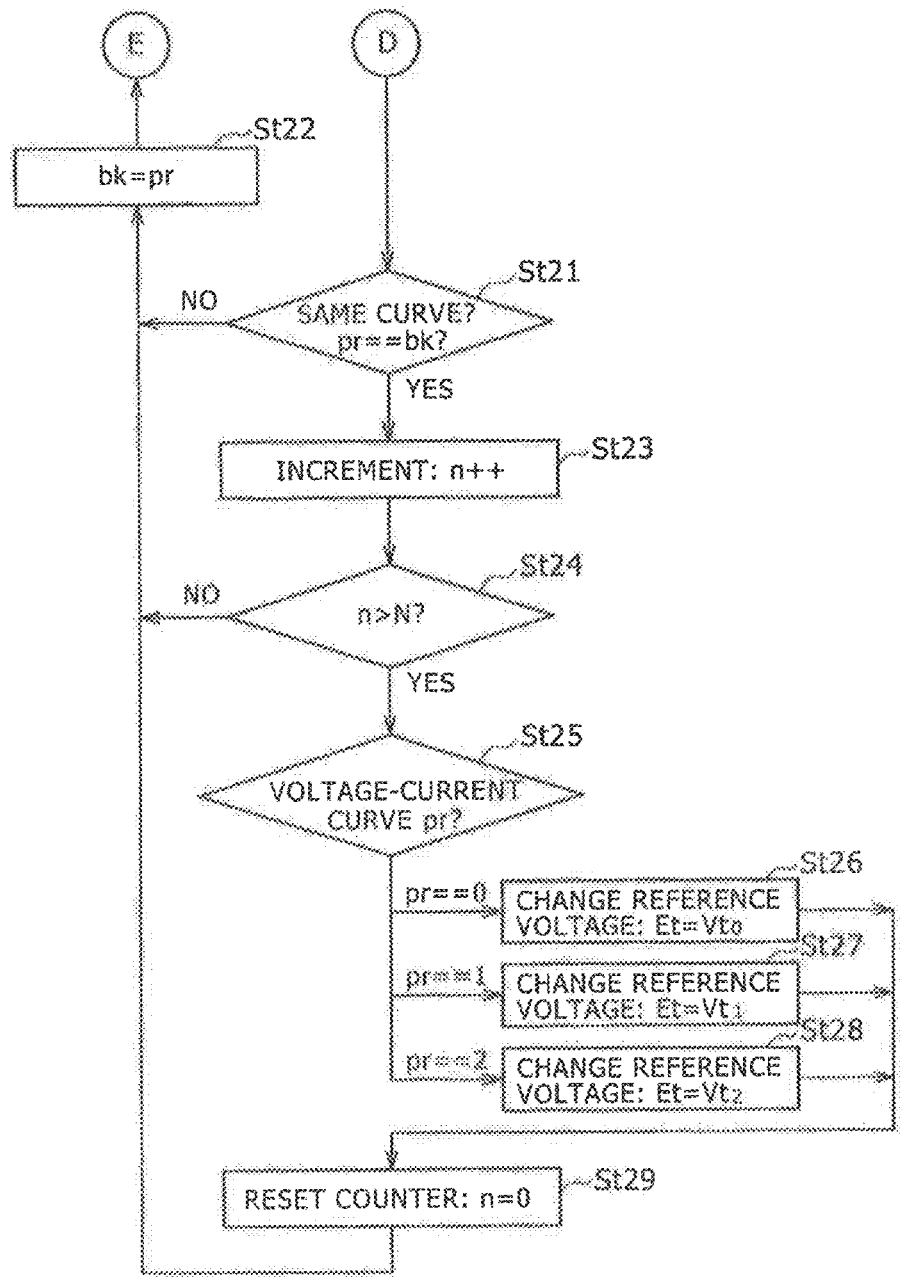

Referring now to FIG. 16, it is decided at step St21 after step St18, St19 or St20 whether or not the operating point at the present point of time is near to the operating point at the time of measurement of the terminal current in the preceding operation cycle. In particular, it is decided whether or not the value of the flag pr which designates the state at present and the value of the flag bk representative of the state at the point of time of measurement in the preceding operation cycle are equal to each other.

If the value of the flag pr and the value of the flag bk are different from each other, then the processing advances to step St22, at which the value of the flag pr is substituted into the flag bk. Thereafter, the processing returns to step St13.

In the case where the value of the flag pr and the value of the flag bk are different from each other, it may be considered that, when a curve representative of a voltage-current characteristic of one solar cell is assumed, the curve on which tone operating point at the time of measurement of the terminal current in the preceding operation cycle is placed and the curve on which the operating point at the present point of time is placed are different from each other. For example, if it is assumed that bk=1 and besides pr=2, then it is considered that, in the time T, the operating point has transferred from the curve C7 to the curve C10.

On the other hand, if the value of the flag pr and the value of the flag bk are equal to each other, then the processing advances to step St23, at which the counter n is incremented. Thus, the value of the counter n represents for what, time period the operating point has remained, when a curve representative of the voltage-current characteristic of the solar cell is assumed, in the proximity of the same curve.

Then at step St24, it is decided whether or not, when a curve representative of the voltage-current, characteristic of the solar cell is assumed, the operating point has been in the proximity of the same curve for a period longer than a period of time set in advance. In particular, it is decided whether or not the value of the counter n and a number N set in advance satisfy a relationship of n>N.

If the operating point has not been in the proximity of the same curve for a period longer than the period of time set in advance, then the processing advances to step St22, at which the value of the flag pr is substituted into the flag bk. Thereafter, the processing returns to step St13.

On the other hand, if it is decided at step St24 that the operating point has been in the proximity of the same curve for a period longer than the period of time set in advance, then the processing advances to step St25.

At steps St25 to St28, the value Et of a reference voltage is set in response to in the neighborhood of which one of the curves representative of voltage-current characteristics of the solar cell the operating point has been.

For example, if the state in which the value of the flag pr is 0 continues for a period longer than the period of time set in advance, then the value Et of the reference voltage is set to Et=$Vt_0$ at step St26. Similarly, if the state in which the value of the flag pr is 1 continues for a period longer than the period of time set in advance, then the value Et of the reference voltage is set to Et=$Vt_1$ at step St27. Further, if the state in which the value of the flag pr is 2 continues for a period longer than the period of time set in advance, then the value Et of the reference voltage is set to Et=$Vt_2$ at step St28.

In particular, for example, in the case where the operating point has remained on the curve C7 for a period longer than the period of time set in advance, in is considered that the stare in which the degree of the deviation between the operating point in the cooperation control and the operating point in the MPPT control is high has continued for more than the set period of time. Therefore, the value Et of the reference voltage is increased to $Vt_1$. On the other hand, for example, in the case where the operating point has remained on the curve C8 (C9) for more than the period of time set in advance, it is considered, that the state in which the degree of deviation between the operating point in the cooperation control and the operating point in the MPPT control is low has continued for more than the set period of time. Therefore, the value Et of the reference voltage is returned to the initial value $Vt_0$.

In other words, in the present disclosure, in the case where the illumination intensity on the solar cell is so low that adjustment of the charge rate by the cooperation control is executed, the value Et of the reference voltage is adjusted suitably in response to the degree of the deviation between the operating point in the cooperation control and the operating point, in the MPPT control. For example, if the illumination intensity upon the solar cell temporarily drops for a period longer than the time set in advance due to sudden rain or the like, then the value Et of the reference voltage is adjusted suitably so that the degree of deviation between the operating point in the cooperation control and the operating point in the MPPT control may be reduced.

Here, for what period of time the operating point has remained in the proximity of the same curve can be determined by the product of the time period T which is a period of measurement and the number b set in advance. Since the time period T and the number N can be arbitrarily set, the period of time can be set arbitrarily such that the value Et of the reference voltage is to be changed when the operating point has remained in the proximity of the same curve for mere than the set period of time. The product of the time period T and the number b, in other words, the period of time to be used as a reference for decision regarding whether or not the value Et of the reference voltage is to be changed, is set within a range from approximately several minutes to approximately several hours taking a change of the weather or a surrounding weather into consideration.

For example, if it as anticipated from a weather forecast that the weather will change extremely, then the time period to be used as a reference for the decision regarding whether or not the value Et of the reference voltage is to be changed can be set, for example, to approximately 10 to 30 minutes. In such a case that finer electric power control in to be carried out, the time period to be used as a reference for the decision regarding whether or cot the value Et of the reference voltage is to be changed may be set to a shorter period of time such as, for example, approximately one to five minutes. Further, in one case where the variation of the weather is small or the time required for the measurement of the terminal voltage is to be suppressed or in a like case, the time period to be used as a reference for the decision regarding whether or not the value Et of the reference voltage is to be changed may conversely be set, for example, to approximately one to five hours.

Accordingly, with the present disclosure, fine electric power control can be carried out in comparison with that in an alternative case in which the value Et of the reference value is fixed. Naturally, in the case where the illumination intensity upon the solar cell increases to such a degree that there is no necessity for one adjustment of the charge rate through the cooperation control, the adjustment of the charge rate by the cooperation control is automatically moderated or canceled.

After the adjustment of the value Et of the reference voltage, the processing advances to step St29, at which the counter n is reset. Thereafter, the processing advances to step St22, at which the value of the flag pr is substituted into the flag bk, whereafter the processing is returned to step St13.

As described above, with the present disclosure, the degree of the deviation between the operating point in the cooperation control and the operating point in the MPPT control in the case where adjustment of the charge rate by the cooperation control is being executed can be reduced, and the loss of the electric power obtained from the solar cell can be suppressed.

Further, in the case where the MPPT control is applied, a comparatively great number of parts for measuring the current and the voltage, which are necessary for calculation of electric power, are required, and a comparatively high cost is required. Besides, if a high-speed A/D converter is used in order to implement high-speed calculation, then the production cost further increases. Further, since measurement of the current or the voltage involves an error, an accurate value may not necessarily be obtained. In order to reduce the influence of the error, a plural number of times of measurement by a moving average method or the like are required, and this further increases the time for calculation. In the case where the MPPT control is applied in this manner, it is difficult to track a weather variation or the like.

In contrast, with the present disclosure, since sequential calculation of electric power as in the MPPT control is not required, it is possible to cope with a sudden variation of the illumination intensity on the solar cell. Further, even in the case where a state in which the illumination intensity on the solar cell is low continues for a fixed period of time, the operating point of the cooperation control can be set nearer to the operating point of the MPPT control by a simple circuit configuration.

With the present disclosure, even if the illumination intensity on the solar cell drops, the electric power to be obtained from the solar cell can be made nearer to electric power obtained by the MPPT control. Thus, the accumulation of the loss in electric power obtained by the solar cell can be suppressed to a minimum level.

It is to be noted that the series of processes described hereinabove with reference to FIGS. 13 to 16 is a mere example at all. Naturally, for example, a log of the terminal current of the solar cell is taken and analyzed to make a decision regarding whether or not the value Et of the reference voltage is to be changed.

<2. Modifications>

Although the embodiment of the present disclosure has been described, the present disclosure is not limited to the embodiment described above but can be modified in various forms. All of the configurations, numerical values, materials and so forth in the present embodiment are mere examples, and the present disclosure is not limited to the configurations and so forth given as the examples. The configurations and so forth given as the examples can be suitably changed within a range within which no technical contradiction occurs.

The control unit and the battery unit in the control system may be portable. The control system described above may be applied, for example, to an automobile or a house.

It is to be noted that the present disclosure may have such configurations as described below.

(1)

A control system, including:

a first apparatus configured to adjust an output voltage thereof so that the output voltage may be included in a range determined in advance in response to a variation of an input voltage thereto from an electric power generation section; and a second apparatus configured to change a charge rate into a battery in response to the variation of the input voltage supplied from the first apparatus; and wherein, when a state in which the output voltage from the first apparatus is near to a lower limit, thereof continues for a period longer than a period of time set in advance, one of two or more lower limits prepared in advance is selected as the value of the lower limit in accordance with to which one of sections set in advance input current from the electric power generation section belongs.

(2)

The control system according to (1), wherein the sections are set in response to the magnitude of a deviation between an operating point when it is assumed that MPPT control is carried our and an operating point when control by interlocking of the adjustment of the output voltage by the first apparatus and the change of the charge rate by the second apparatus is carried out.

(3)

The control system according to (1) or (2), wherein the lower limit is raised when a voltage value of an operating point on the same voltage-current characteristic curve relating to the electric power generation section when it is assumed that MPPT control is carried out is higher than a voltage value of another operating point when control by interlocking of the adjustment of the output voltage by the first apparatus and the change of the charge rate by the second apparatus is carried out.

(4)

The control system according to any one of (1) to (3), wherein the lower limit is lowered when a voltage value of an operating point on the same voltage-current characteristic curve relating to the electric power generation section when it is assumed that MPPT control is carried out is lower than a voltage value of another operating point when control by interlocking of the adjustment of the output voltage by the first apparatus and the change of the charge rate by the second apparatus is carried out.

(5)

The control system according to any one of (1) to (4), wherein the period of time set in advance is equal to or longer than one minute but equal to or shorter than five hours.

(6)

The control system according to any one of (1) to (5), wherein it is determined whether to change the charge rate by comparison between the input voltage from the electric power generation section and a threshold value set in advance.

(7)

A control apparatus, wherein the control apparatus adjusts an output voltage thereof so that the output voltage may be included in a range determined in advance in response to a variation of an input voltage thereto from an electric power generation section and selects, when a state in which the output, voltage is near to a lower limit thereof in the range determined in advance continues for a period longer than a period of time set in advance, one of two or more lower limits prepared in advance as the value of the lower limit in accordance with to which one of sections set in advance input current from the electric power generation section belongs.

(8)

A control method, including:

adjusting an output voltage from a first apparatus so that the output voltage may be included in a range determined in advance in response to a variation of an input voltage from an electric power generation section;

changing a charge rate into a battery in response to the variation of the input voltage supplied from the first apparatus to a second apparatus; and selecting, when a state in which the output voltage from the first apparatus is near to a lower limit thereof continues for a period longer than a period of time set in advance, one of two or more lower limits prepared in advance as the value of the lower limit in accordance with to which one of sections set in advance input current from the electric power generation section belongs.

The present disclosure contains subject matter related to that disclosed in Japanese Priority Patent Application JP 2011-241136 filed in the Japan Patent Office on Nov. 2, 2011, the entire content of which is hereby incorporated by reference.

What is claimed is:

1. A control system, comprising:
a first apparatus configured to adjust an output voltage thereof such that the output voltage is included in a predetermined range, wherein the output voltage is adjusted in response to a variation of an input voltage thereto from an electric power generation section; and
a second apparatus configured to change a charge rate of a battery in response to the variation of the input voltage supplied to the first apparatus,
wherein when the input voltage is less than or equal to a sum of a predetermined value and a value of a lower limit of the input voltage for more than a predetermined period of time, one of two or more predetermined lower limits, different from the value of the lower limit, is selected as the value of the lower limit of the input voltage.

2. The control system according to claim 1, wherein the one of the two or more predetermined lower limits are set in response to a magnitude of a deviation between a first operating point obtained based on an assumption that maximum power point tracking control is carried out and a second operating point obtained based on an assumption that control by interlocking of the adjustment of the output voltage by the first apparatus and the change of the charge rate by the second apparatus are carried out.

3. The control system according to claim 1, wherein the lower limit of the input voltage is raised when a voltage value of a first operating point on a voltage-current characteristic curve corresponding to the electric power generation section, is higher than a voltage value of a second operating point obtained based on an assumption that control by interlocking of the adjustment of the output voltage by the first apparatus and the change of the charge rate by the second apparatus are carried out, wherein the first operating point is obtained based on an assumption that maximum power point tracking control is carried out.

4. The control system according to claim 1, wherein the lower limit of the input voltage is lowered when a voltage value of a first operating point on a voltage-current characteristic curve corresponding to the electric power generation section, is lower than a voltage value of a second operating point obtained based on an assumption that control by interlocking of the adjustment of the output voltage by the first apparatus and the change of the charge rate by the second apparatus are carried out, wherein the first operating point is obtained based on an assumption that maximum power point tracking control is carried out.

5. The control system according to claim 1, wherein the predetermined period of time is equal to or greater than one minute and equal to or less than five hours.

6. The control system according to claim 1, wherein the control system is configured to determine whether to change the charge rate by comparing the input voltage from the electric power generation section and a threshold value set in advance.

7. A control apparatus, wherein the control apparatus is configured to:
adjust an output voltage thereof such that the output voltage is included in a predetermined range, wherein the output voltage is adjusted in response to a variation of an input voltage thereto from an electric power generation section, wherein,
when the input voltage is less than or equal to a sum of a predetermined value and a value of a lower limit of the input voltage for more than a predetermined period of time, one of two or more predetermined lower limits, different from the value of the lower limit is selected as the value of the lower limit of the input voltage.

8. A control method, comprising:
adjusting an output voltage from a first apparatus such that the output voltage is included in a predetermined range, wherein the output voltage is adjusted in response to a variation of an input voltage from an electric power generation section;
changing a charge rate of a battery in response to the variation of the input voltage supplied to the first apparatus, wherein
when the input voltage is less than or equal to a sum of a predetermined value and a value of a lower limit of the input voltage for more than a predetermined period of time, one of two or more predetermined lower limits, different from the value of the lower limit is selected as the value of the lower limit of the input voltage.

* * * * *